(12) United States Patent
Nozawa et al.

(10) Patent No.: US 6,272,543 B1
(45) Date of Patent: *Aug. 7, 2001

(54) NETWORK-COMPUTER SYSTEM BUILD SUPPORT SYSTEM AND SUPPORT METHOD

(75) Inventors: Yukiteru Nozawa, Fuchu; Noboru Fujimaki, Yokohama; Seiji Iwata, Hachioji; Toshiyuki Obi, Funabashi, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/718,739

(22) Filed: Sep. 18, 1996

(30) Foreign Application Priority Data

Sep. 19, 1995 (JP) ...................................... 7-240025

(51) Int. Cl.[7] .................................................... G06F 15/00
(52) U.S. Cl. ............................................................ 709/226
(58) Field of Search ................................. 364/578, 151, 364/402; 395/650, 500, 500.25; 709/310–332, 200–253

(56) References Cited

U.S. PATENT DOCUMENTS

| | | | |
|---|---|---|---|
| 5,247,651 | * 9/1993 | Clarisse | 703/13 |
| 5,404,516 | * 4/1995 | Georgiades et al. | 709/104 |
| 5,471,408 | * 11/1995 | Takamato et al. | 703/2 |
| 5,603,015 | * 2/1997 | Kurosawa et al. | 703/15 |
| 5,754,831 | * 5/1998 | Berman | 703/13 |
| 5,799,153 | * 8/1998 | Blau et al. | 709/223 |
| 6,058,260 | * 5/2000 | Brockel et al. | 703/4 |

FOREIGN PATENT DOCUMENTS

| | | | |
|---|---|---|---|
| 5-2474 | 1/1993 | (JP) | G06F/9/06 |
| 5-342303 | 12/1993 | (JP) | G06F/15/60 |

OTHER PUBLICATIONS

Yanbing Li et al. "Hardware/Software Co–synthesis with Memory Hierarchies" pp 1405–1417, IEEE, Oct. 1999.*

"Second–Generation C/S System Development Environment for Implementing AP Partitioning", Network Computing, pp. 108–113, Aug. 1995.

* cited by examiner

Primary Examiner—St. John Courtenay, III
(74) Attorney, Agent, or Firm—Finnegan, Henderson, Farabow, Garrett & Dunner, L.L.P.

(57) ABSTRACT

The worker enters information regarding allocation objects, necessary to build a client-server system, from the problem input means 10. The worker also specifies in advance, through the characteristic input means 11, the characteristic the allocation result should have. The worker enters information necessary to get an effective allocation from the supplementary information input means 12. When the allocation means 13 receives information from the problem input means 10, characteristic input means 11, and supplementary information input means 12, it searches for an effective allocation result. The allocation means 13 then outputs the result to the allocation result output means 16, and the worker judges the result using the judgment result input means 15. The final allocation result output means 16 outputs the allocation result which is judged as the final allocation.

According to this invention, an effective allocation result satisfying the required characteristic simply by entering a small amount of data is quickly given.

31 Claims, 21 Drawing Sheets

FIG. 3

| TRANSACTION NAME |
|---|
| TRANSACTION 1 |
| TRANSACTION 2 |
| TRANSACTION 3 |
| TRANSACTION 4 |

FIG. 4

| PROCESS NAME |
|---|
| PROCESS 1 |
| PROCESS 2 |
| PROCESS 3 |
| PROCESS 4 |

FIG. 5

| TRANSACTION NAME | PROCESS NAME |
|---|---|
| TRANSACTION 1 | PROCESS 1 |
| TRANSACTION 1 | PROCESS 2 |
| TRANSACTION 2 | PROCESS 1 |
| TRANSACTION 2 | PROCESS 3 |
| TRANSACTION 2 | PROCESS 4 |
| TRANSACTION 3 | PROCESS 3 |
| TRANSACTION 3 | PROCESS 5 |
| TRANSACTION 4 | PROCESS 1 |
| TRANSACTION 4 | PROCESS 2 |
| TRANSACTION 4 | PROCESS 4 |

FIG. 6

| DATA NAME |
|---|
| DATA 1 |
| DATA 2 |
| DATA 3 |
| DATA 4 |
| DATA 5 |
| DATA 6 |
| DATA 7 |

FIG. 7

| PROCESS NAME | DATA NAME |
|---|---|
| PROCESS 1 | DATA 1 |
| PROCESS 1 | DATA 3 |
| PROCESS 2 | DATA 1 |
| PROCESS 2 | DATA 2 |
| PROCESS 2 | DATA 4 |
| PROCESS 3 | DATA 2 |
| PROCESS 3 | DATA 3 |
| PROCESS 4 | DATA 4 |
| PROCESS 5 | DATA 5 |
| PROCESS 5 | DATA 6 |
| PROCESS 5 | DATA 7 |

FIG. 8

| TABLE NAME |
|---|
| TABLE 1 |
| TABLE 2 |
| TABLE 3 |
| TABLE 4 |
| TABLE 5 |

FIG. 9

| TABLE NAME | DATA NAME |
|---|---|
| TABLE 1 | DATA 1 |
| TABLE 1 | DATA 2 |
| TABLE 2 | DATA 3 |
| TABLE 3 | DATA 4 |
| TABLE 3 | DATA 5 |
| TABLE 4 | DATA 6 |
| TABLE 5 | DATA 7 |

FIG. 10

| NODE NAME | UNAUTHORIZED ACCESS POSSIBILITY |
|---|---|
| NODE 1 | 0.9 |
| NODE 1 | 0.1 |
| NODE 3 | 0.8 |
| NODE 4 | 0.9 |
| NODE 5 | 0.9 |

FIG. 11

| NODE NAME | CONNECTION NODE NAME | COMMUNICATION SPEED |
|---|---|---|
| NODE 1 | NODE 2 | 10 Mbps |
| NODE 2 | NODE 1 | 10 Mbps |
| NODE 2 | NODE 3 | 100 Mbps |
| NODE 2 | NODE 4 | 2.4 Mbps |
| NODE 3 | NODE 2 | 100 Mbps |
| NODE 4 | NODE 2 | 2.4 Mbps |
| NODE 4 | NODE 5 | 10 Mbps |
| NODE 5 | NODE 4 | 10 Mbps |

FIG. 12

| TRANSACTION NAME | NODE NAME |
|---|---|
| TRANSACTION 1 | NODE 1 |
| TRANSACTION 1 | NODE 3 |
| TRANSACTION 1 | NODE 4 |
| TRANSACTION 2 | NODE 2 |
| TRANSACTION 3 | NODE 3 |
| TRANSACTION 3 | NODE 4 |
| TRANSACTION 4 | NODE 1 |
| TRANSACTION 4 | NODE 2 |
| TRANSACTION 4 | NODE 5 |

FIG. 22

| NODE NAME | PROCESS NAME |
|---|---|
| NODE 1 | PROCESS 1 |
| NODE 1 | PROCESS 2 |
| NODE 1 | PROCESS 4 |
| NODE 2 | PROCESS 5 |
| NODE 3 | PROCESS 3 |
| NODE 4 | PROCESS 1 |
| NODE 4 | PROCESS 2 |
| NODE 4 | PROCESS 4 |
| NODE 5 | PROCESS 1 |
| NODE 5 | PROCESS 5 |

FIG. 23

| NODE NAME | TABLE NAME | CONTENTS |
|---|---|---|
| NODE 1 | TABLE 1 | ASYNCHRONOUS COPY |
| NODE 1 | TABLE 2 | SYNCHRONOUS COPY |
| NODE 1 | TABLE 3 | ASYNCHRONOUS COPY |
| NODE 1 | TABLE 4 | ENTITY |
| NODE 1 | TABLE 5 | ASYNCHRONOUS COPY |
| NODE 2 | TABLE 1 | ENTITY |
| NODE 2 | TABLE 2 | SYNCHRONOUS COPY |
| NODE 2 | TABLE 3 | SYNCHRONOUS COPY |
| NODE 2 | TABLE 4 | ASYNCHRONOUS COPY |
| NODE 2 | TABLE 5 | ENTITY |
| NODE 3 | TABLE 3 | ENTITY |
| NODE 3 | TABLE 4 | SYNCHRONOUS COPY |
| NODE 4 | TABLE 3 | ASYNCHRONOUS COPY |
| NODE 5 | TABLE 1 | SYNCHRONOUS COPY |
| NODE 5 | TABLE 2 | ENTITY |
| NODE 5 | TABLE 4 | ASYNCHRONOUS COPY |
| NODE 5 | TABLE 5 | SYNCHRONOUS COPY |

FIG. 24

ALLOCATION RESULT (NODE-PROCESS) OUTPUT WINDOW

|        | PROCESS 1 | 2 | 3 | 4 | 5 |
|--------|-----------|---|---|---|---|
| NODE 1 | Y | Y | N | Y | N |
| 2      | N | N | N | N | Y |
| 3      | N | N | Y | N | N |
| 4      | Y | Y | N | Y | N |
| 5      | Y | N | N | N | Y |

Y    ALLOCATE      N    DO NOT ALLOCATE

FIG. 25

ALLOCATION RESULT (NODE-TABLE) OUTPUT WINDOW

|        | TABLE 1 | 2 | 3 | 4 | 5 |
|--------|---------|---|---|---|---|
| NODE 1 | A | S | A | E | A |
| 2      | E | S | S | A | E |
| 3      | N | N | E | S | N |
| 4      | N | N | A | N | N |
| 5      | S | E | N | A | S |

E    ALLOCATE ENTITY  
S    ALLOCATE SYNCHRONOUS COPY  
A    ALLOCATE ASYNCHRONOUS COPY  
N    DO NOT ALLOCATE

| NODE NAME | PROCESS NAME |
|---|---|
| NODE 1 | PROCESS 1 |
| NODE 1 | PROCESS 2 |
| NODE 1 | PROCESS 4 |
| NODE 2 | PROCESS 5 |
| NODE 3 | PROCESS 3 |
| NODE 4 | PROCESS 1 |
| NODE 4 | PROCESS 2 |
| NODE 4 | PROCESS 4 |
| NODE 5 | PROCESS 1 |
| NODE 5 | PROCESS 2 |
| NODE 5 | PROCESS 4 |
| NODE 5 | PROCESS 5 |

FIG. 28

| NODE NAME | TABLE NAME | CONTENTS |
|---|---|---|
| NODE 1 | TABLE 1 | SYNCHRONOUS COPY |
| NODE 1 | TABLE 1 | SYNCHRONOUS COPY |
| NODE 1 | TABLE 1 | SYNCHRONOUS COPY |
| NODE 1 | TABLE 1 | ENTITY |
| NODE 1 | TABLE 1 | SYNCHRONOUS COPY |
| NODE 1 | TABLE 1 | ENTITY |
| NODE 1 | TABLE 1 | SYNCHRONOUS COPY |
| NODE 1 | TABLE 1 | SYNCHRONOUS COPY |
| NODE 1 | TABLE 1 | SYNCHRONOUS COPY |
| NODE 1 | TABLE 1 | ENTITY |
| NODE 1 | TABLE 1 | ENTITY |
| NODE 1 | TABLE 1 | SYNCHRONOUS COPY |
| NODE 1 | TABLE 1 | ASYNCHRONOUS COPY |
| NODE 1 | TABLE 1 | SYNCHRONOUS COPY |
| NODE 1 | TABLE 1 | ENTITY |
| NODE 1 | TABLE 1 | SYNCHRONOUS COPY |
| NODE 1 | TABLE 1 | SYNCHRONOUS COPY |

FIG. 29

| | ALLOCATION RESULT (NODE-PROCESS) OUTPUT WINDOW | | | | |
|---|---|---|---|---|---|
| | PROCESS 1 | 2 | 3 | 4 | 5 |
| NODE 1 | Y | Y | N | Y | N |
| 2 | N | N | N | N | Y |
| 3 | N | N | Y | N | N |
| 4 | Y | Y | N | Y | N |
| 5 | Y | Y | N | Y | Y |

Y   ALLOCATE          N   DO NOT ALLOCATE

FIG. 30

| | ALLOCATION RESULT (NODE-TABLE) OUTPUT WINDOW | | | | |
|---|---|---|---|---|---|
| | TABLE 1 | 2 | 3 | 4 | 5 |
| NODE 1 | S | S | S | E | S |
| 2 | E | S | S | S | E |
| 3 | N | N | E | S | N |
| 4 | N | N | A | N | N |
| 5 | S | E | N | S | S |

E     ALLOCATE ENTITY
S     ALLOCATE SYNCHRONOUS COPY
A     ALLOCATE ASYNCHRONOUS COPY
N     DO NOT ALLOCATE

FIG. 31

| NODE NAME | PROCESS NAME | CONTENTS |
|---|---|---|
| NODE 1 | PROCESS 1 | ALLOCATE |
| NODE 2 | PROCESS 4 | DO NOT ALLOCATE |
| NODE 2 | PROCESS 5 | ALLOCATE |
| NODE 3 | PROCESS 1 | DO NOT ALLOCATE |
| NODE 4 | PROCESS 2 | ALLOCATE |
| NODE 5 | PROCESS 3 | DO NOT ALLOCATE |

FIG. 32

| NODE NAME | TABLE NAME | CONTENTS |
|---|---|---|
| NODE 1 | TABLE 2 | SYNCHRONOUS COPY |
| NODE 2 | TABLE 1 | ENTITY |
| NODE 3 | TABLE 3 | ENTITY |
| NODE 3 | TABLE 5 | ASYNCHRONOUS COPY |
| NODE 4 | TABLE 3 | ASYNCHRONOUS COPY |
| NODE 5 | TABLE 2 | ENTITY |

FIG. 33

| | PROCESS 1 | 2 | 3 | 4 | 5 |
|---|---|---|---|---|---|
| NODE 1 | Y | | | | |
| 2 | | | | N | Y |
| 3 | N | | | | |
| 4 | | Y | | | |
| 5 | | | N | | |

SUPPLEMENTARY INFORMATION (NODE-PROCESS) ENTRY WINDOW

Y    ALLOCATE      N    DO NOT ALLOCATE

FIG. 34

| | TABLE 1 | 2 | 3 | 4 | 5 |
|---|---|---|---|---|---|
| NODE 1 | | S | | | |
| 2 | E | | | | |
| 3 | | | E | | N |
| 4 | | | A | | |
| 5 | | E | | | |

SUPPLEMENTARY INFORMATION (NODE-TABLE) ENTRY WINDOW

E    ALLOCATE ENTITY
S    ALLOCATE SYNCHRONOUS COPY
A    ALLOCATE ASYNCHRONOUS COPY
N    DO NOT ALLOCATE

E    ALLOCATE ENTITY
S    ALLOCATE SYNCHRONOUS COPY
A    ALLOCATE ASYNCHRONOUS COPY
N    DO NOT ALLOCATE

TIME-SERIES REPRESENTATION OF THE COMBINATION OF A NODE AND A PROCESS

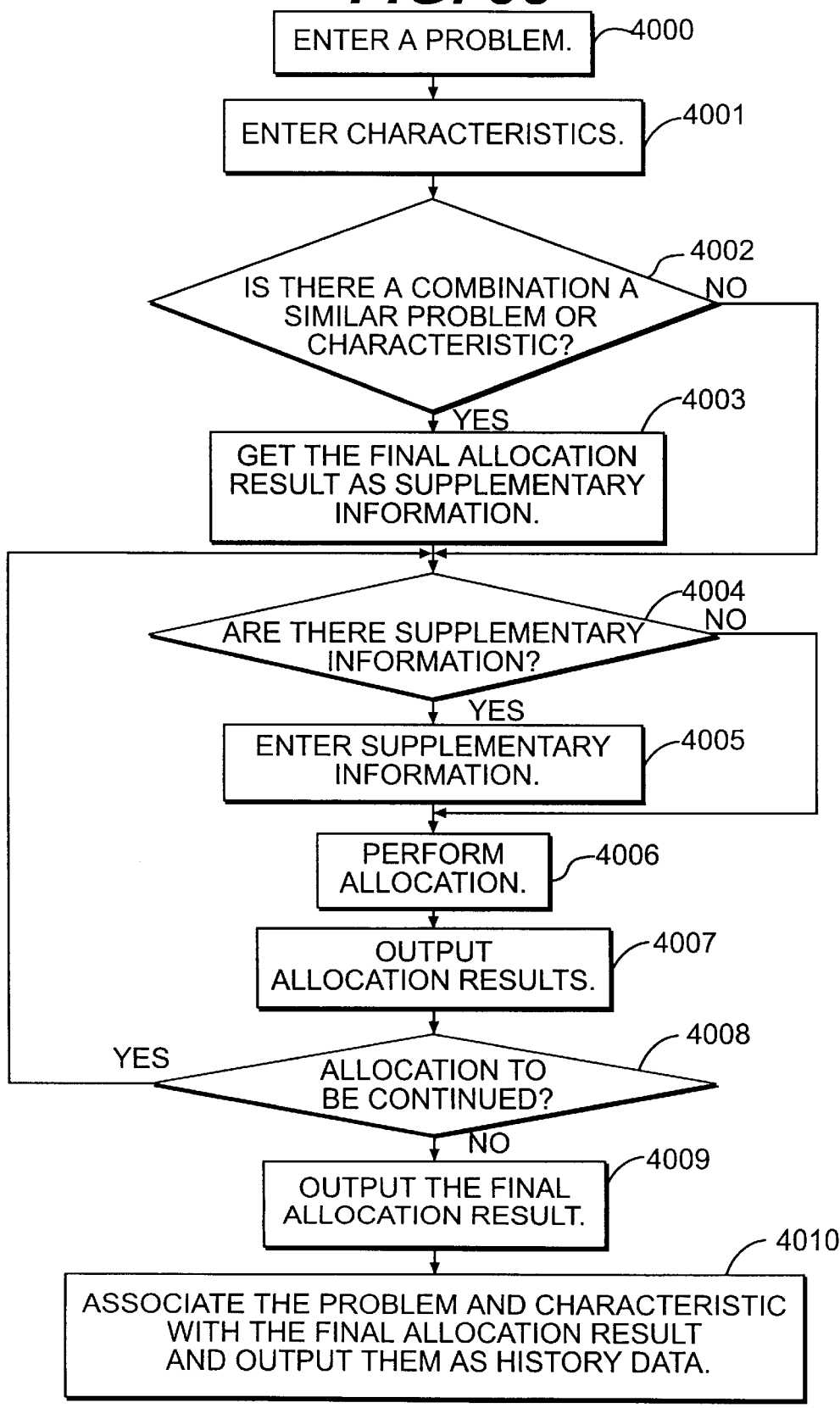

NETWORK-COMPUTER SYSTEM BUILD SUPPORT SYSTEM AND SUPPORT METHOD

BACKGROUND OF THE INVENTION

1. Field of the Invention

This invention relates to a system which helps to build a network-computer system as a client-server system and so on.

2. Description of the Prior Art

Building a client-server system requires the optimized allocation of processes and tables so that the characteristics required for the client-server system, such as performance and reliability, are satisfied as much as possible.

For example, when building a client-server system, the processes and tables should be allocated in each node according to problems consisted of the following factors:
(1) What processes make up a transaction that is run in the client-server system ?
(2) What data does a running process handle?
(3) In what table is the data stored?
(4) What communication path and what communication speed does each node use for processing a transaction?
(5) How much is each node affected by an unauthorized access?
(6) From which node is each transaction entered?

Theoretically, there is an enormous number of allocation results that are solutions to the above mentioned problems. In building a client-server system, some of these allocation results, for example, performance, reliability, security, consistency, and costs, are taken into consideration. It is very difficult to find in these allocation results the allocation result which satisfies the characteristics, for example, performance, reliability, security, consistency, and costs as enough as a worker requires. Therefore, depending upon the characteristics on which the system will place emphasis according to its purpose or use, the optimized allocation varies although the factors described above are satisfied similarly. This means that, in building a system, appropriate allocation should be done taking two factors into consideration: requirements for system configuration and the characteristics required for the system.

3. Problems to be Solved by the Invention

Traditionally, the above-described allocation is done based on the know-how of the worker. And, there are some support systems which allow the worker to allocate objects via the graphical user interface. These prior arts were introduced in "C/S Application Development and Management Tools for Large-Scale Transactions" in the April, 1995, issue of Network Computing, pp. 99–pp. 103, or in "Second-Generation C/S System Development Environment for Implementing AP Partitioning" in the August, 1995, issue of Network Computing, pp. 108–pp. 113.

The traditional support system according to the prior art only helps the worker put the allocation results in order. However, as a client-server system evolves from the one-tier architecture to the two-tier architecture and then to the three-tier architecture, it becomes more and more difficult to decide the allocation of objects. Moreover, increase in number of machines and databases forming a client-server system accelerates the difficulty of the allocation. It is also difficult to allocate objects while evaluating the trade-off among the characteristics required for a client-server system. This means that, the worker must allocate a large number of objects with these difficulties. However, the traditional support system according to the prior art does not help the worker solve this problem, that is, it does not reduce what he must think.

A traditional support system tries to help the thinking of the worker as follows. That is, the support system creates a model of a client-server system to be built and, using supplied data, performs simulation to reproduce the behavior of the client-server system. However, this support system requires a large amount of data for simulating the complicated modeling of a client-server system to be built and the behavior of the client-server system. In addition, in most cases, the simulation takes long. For these reason, this support system is not suitable for the client-server system build task which must be done simply and quickly.

In Japanese Non-Examined Patent Publication No. 5-342303, there is disclosed a method for solving the problem of the worker having to wait for a long when building a client-server system. This prior art allows the worker, responsible for building a system, to evaluate the performance of the system to be built and then modify the system according to the evaluation result. This makes it possible the worker to progressively design the system while feeding back the evaluation results. And, shortening the cycle of this feed back speeds up the work.

However, the prior art described above requires the worker responsible for building the system to describe the allocation method. As described above, the allocation work, which is based on the know-how of the designer, is very difficult. Therefore, the designer responsible for building finds it still more difficult to describe the allocation and describing it is a burden for him.

In Japanese Non-Examined Patent Publication No. 5-2474, there is disclosed another approach to the effective allocation of processes and databases. This prior art provides means for using some components or typical examples of the system to be built as parts which can be re-used, thus speeding up the design work. However, in this prior art, the worker responsible for building a client-server system must explicitly specify the parts to be used. Not only that, when the worker re-uses parts, he must modify the parts according to his needs.

The above problems are those about the technique of the help with the worker responsible for building a client-server system. But, not only the worker responsible for building a client-server system but also the developer responsible for developing the client-server system build-up system has problems. That is, creating a system which gives the strictly optimized, effective allocation results requires the developer to prepare complicate solutions. This makes the development work difficult.

To solve the above-mentioned problem, it is an object of the present invention to provide a network-computer system build support system which quickly gives the worker, responsible for building a client-server system, an allocation result which is generated by simply entering a small amount of data and which eliminates the need for the worker to devise an allocation method. The allocation result thus generated may not be the strictly optimized result but is effective enough to satisfy the characteristics required for a client-server system.

It is a further object of the present invention to provide a network-computer system build support system which, if a generated allocation result is not effective enough, allows the worker to enter supplementary informations to quickly produce a more effective allocation. Repeating the process of entering supplementary information and producing an allocation, the result becomes effective enough.

It is yet another object of the present invention to provide a network-computer system build support system which employs the above-mentioned repetitive process to eliminate the need for the developer of the network-computer system build support system to have to develop a complicated solution in order to generate an allocation result that is effective enough.

It is still another object of the present invention to provide a network-computer system build support system which, when a client-server system that was built in the past is re-modeled or extended, gives the worker, responsible for building a client-server system, a lot of useful information and thus increases the working efficiency. In particular, it is an object of the present invention to generate an allocation result that is effective enough by automating the means for making use of past cases while minimizing the load on the worker responsible for building a client-server system.

SUMMARY OF THE INVENTION

To achieve the above objects, the present invention is a network-computer system build support system, as shown in FIG. 1, comprising: a problem input means 10 for entering information on the objects of a client-server system to be built; a characteristic input means 11 for specifying, in advance, a characteristic regarding an allocation result; a supplementary information input means 12 for entering useful information regarding an allocation result as the need arises; an allocation means 13 for generating a fixed allocation result based on information entered from the problem input means 10, a supplementary information input means 12, and the characteristic input means 11; an allocation result output means 14 for outputting an allocation result generated by the allocation means 13; a judgment result input means 15 for entering a judgment on an allocation result output from the allocation result output means 14; and a final allocation result output means 16 for outputting an allocation result that is judged by the judgment result input means 15 as the final allocation, wherein.

The present invention, with the above configuration, allocates the processes and tables of an entered problem quickly while considering the characteristics based on the given supplementary informations, by the algorithm which generates the effective allocation result quickly though the solution may not be the strictly optimized. The worker who is to build a client-server system checks the allocation result to see if it may be used as the final allocation result. If it is, the allocation result is used as the final allocation result; if it is not, the worker may give some supplementary informations to get a more effective allocation result. The system with the history generation means references history information generated by the history generation means, reducing the number of repetitions of the process in which the allocation result is further improved.

Thus, the present invention allows the worker to judge whether the current allocation result is used as the final allocation result when a semi-optimized solution is obtained and to repeat the process of allocation result generation by giving supplementary informations to the obtained semi-optimized solution. So, the developer of a system for building a client-server system is able to develop a network-computer system build support system simply by providing an algorithm which generates a solution quickly though the solution may not be the strictly optimized solution.

Other and further objects, features and advantages of the invention will appear more fully from the following description.

BRIEF DESCRIPTION OF THE DRAWINGS

FIG. 3 is a diagram showing an example of objects to be allocated in building a client-server system.

FIG. 4 is a diagram showing an example of objects to be allocated in building a client-server system.

FIG. 5 is a diagram showing an example of objects to be allocated in building a client-server system.

FIG. 6 is a diagram showing an example of objects to be allocated in building a client-server system.

FIG. 7 is a diagram showing an example of objects to be allocated in building a client-server system.

FIG. 8 is a diagram showing an example of objects to be allocated in building a client-server system.

FIG. 9 is a diagram showing an example of objects to be allocated in building a client-server system.

FIG. 10 is a diagram showing an example of objects to be allocated in building a client-server system.

FIG. 11 is a diagram showing an example of objects to be allocated in building a client-server system.

FIG. 12 is a diagram showing an example of objects to be allocated in building a client-server system.

FIG. 22 is a diagram showing allocation results.

FIG. 23 is a diagram showing allocation results.

FIG. 24 is a diagram showing an example of the allocation result output means in the first embodiment.

FIG. 25 is a diagram showing an example of the allocation result output means in the first embodiment.

FIG. 28 is a diagram showing an example of final allocation results.

FIG. 29 is a diagram showing an example of the final allocation result output means in the first embodiment.

FIG. 30 is a diagram showing an example of the final allocation result output means in the first embodiment.

FIG. 31 is an example of useful informations for allocation.

FIG. 32 is an example of useful informations for allocation.

FIG. 33 is a diagram showing an example of the supplementary information input means used in the first embodiment.

FIG. 34 is a diagram showing an example of the supplementary information input means used in the first embodiment.

FIG. 38 is a flowchart showing the process flow of the second embodiment of this invention.

DETAILED DESCRIPTION

A. First Embodiment

Referring to the attached drawings, there is shown the first embodiment of the present invention. This embodiment corresponds to claims 1 to 8, 18, and 19. In this embodiment, as an example of a network computer system, a client-server system is shown.

Figure 1:
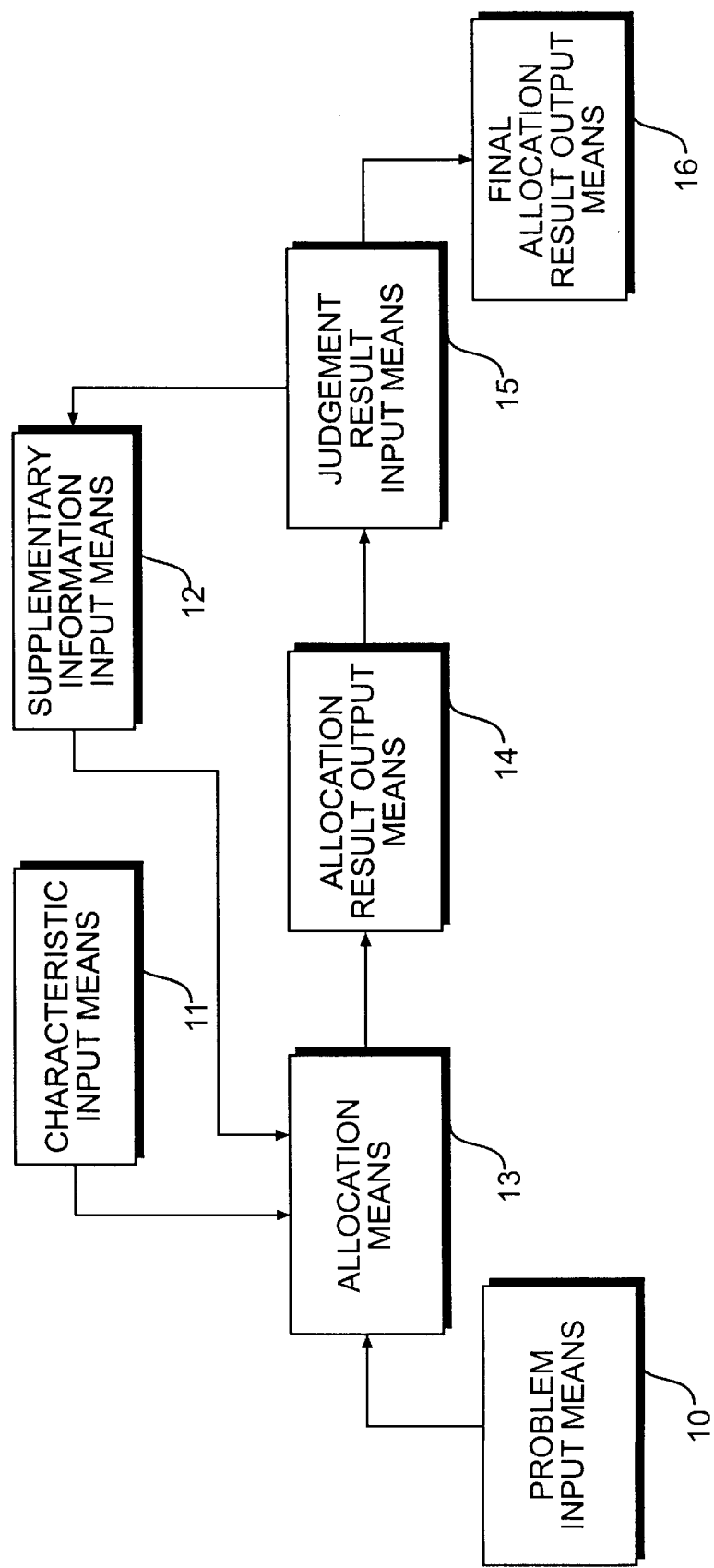
FIG. 1 is a diagram showing the overall configuration of the first embodiment of the network-computer system build support system according to this invention.

FIG. 1 shows the overall configuration of this embodiment. This embodiment comprises the problem input means 10, characteristic input means 11, supplementary information input means 12, allocation means 13, allocation result output means 14, judgment result input means 15, and final allocation result output means 16. The following describes these meanss more in detail.

(1) Problem input means 10

Figure 2:
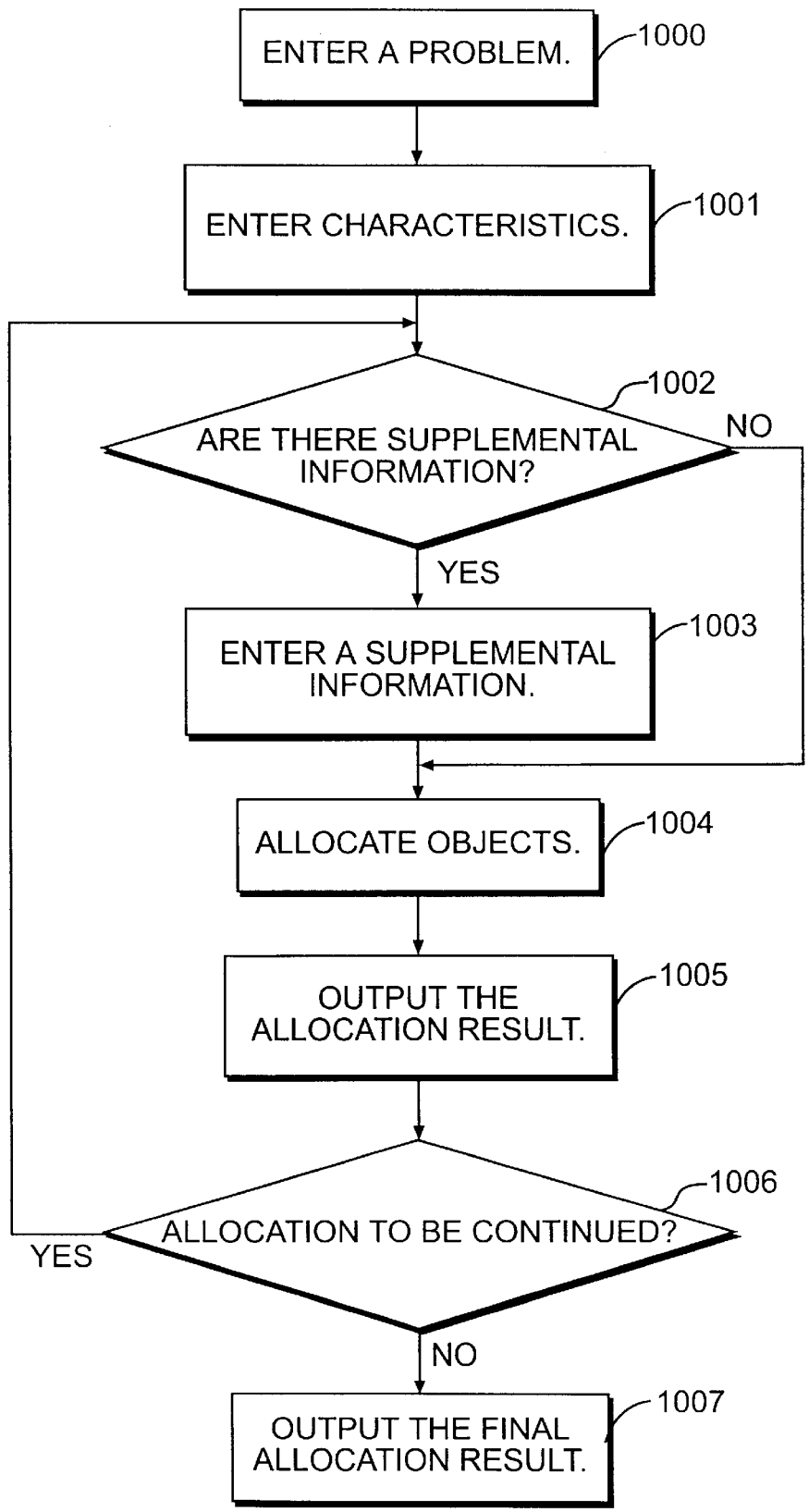
FIG. 2 is the flowchart showing the process flow of the network-computer system build support system in FIG. 1.

A worker who is to build a client-server system enters information on the objects to be allocated in building the client-server system, such as those shown in FIGS. 3, 4, 5, 6, 7, 8, 9, 10, 11, and 12, from the problem input means 10 (step 1000 in FIG. 2). FIG. 3 shows the list of transactions to be processed by the client-server system to be built. FIG. 4 shows the list of processes to be run in the client-server system to be built. FIG. 5 shows the processes which constitute each transaction to be processed by the client-server system.

FIG. 6 shows the list of data the client-server system to be built will use. FIG. 7 shows what data the processes to be run on the client-server system to be built will use. FIG. 8 shows the list of tables that the client-server system to be built will maintain FIG. 9 shows the data stored in the tables that the client-server system to be built will maintain. FIG. 10 shows the list of the nodes constituting the client-server system to be built and the possibilities of unauthorized access to those nodes.

FIG. 11 shows how the nodes constituting the client-server system to be built are interconnected, that is, the names of interconnected nodes and the communication speeds of the communication paths connecting the nodes. FIG. 12 shows from which nodes the transactions to be processed by the client-server system to be built are entered.

Figure 13:
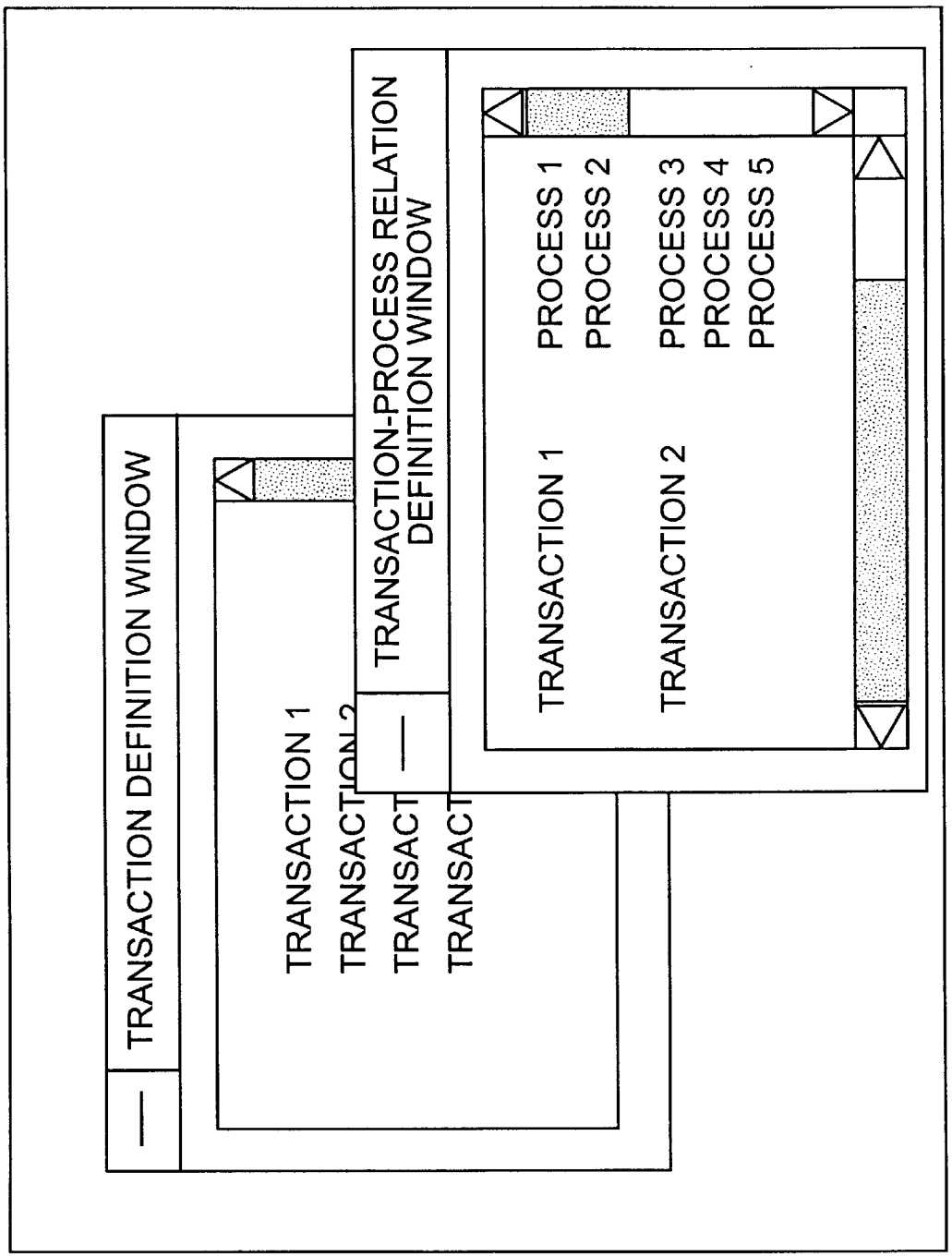
FIG. 13 is a diagram showing an example of the problem input means in the first embodiment.

The problem input means 10 comprises the keyboard, mouse, and other input means. FIG. 13 shows an example of the problem input means 10. FIG. 13 shows an example of an interactive input means which uses the graphical user interface. Although information is represented using the format of a table in a relational database in this embodiment, any other representation formats may be used provided that the same information may be represented. Similarly, any other input means may be used provided that the same information may be entered.

And, the items used to represent a problem need not necessarily be the same as those used in this embodiment, nor must all the items of this embodiment be used. This means that the developer of the network-computer system build support system may select what should be entered via the problem input means 10, thereby minimizing the amount of information the worker of the client-server system must enter.

(2) Characteristic Input Means 11

Figure 14:
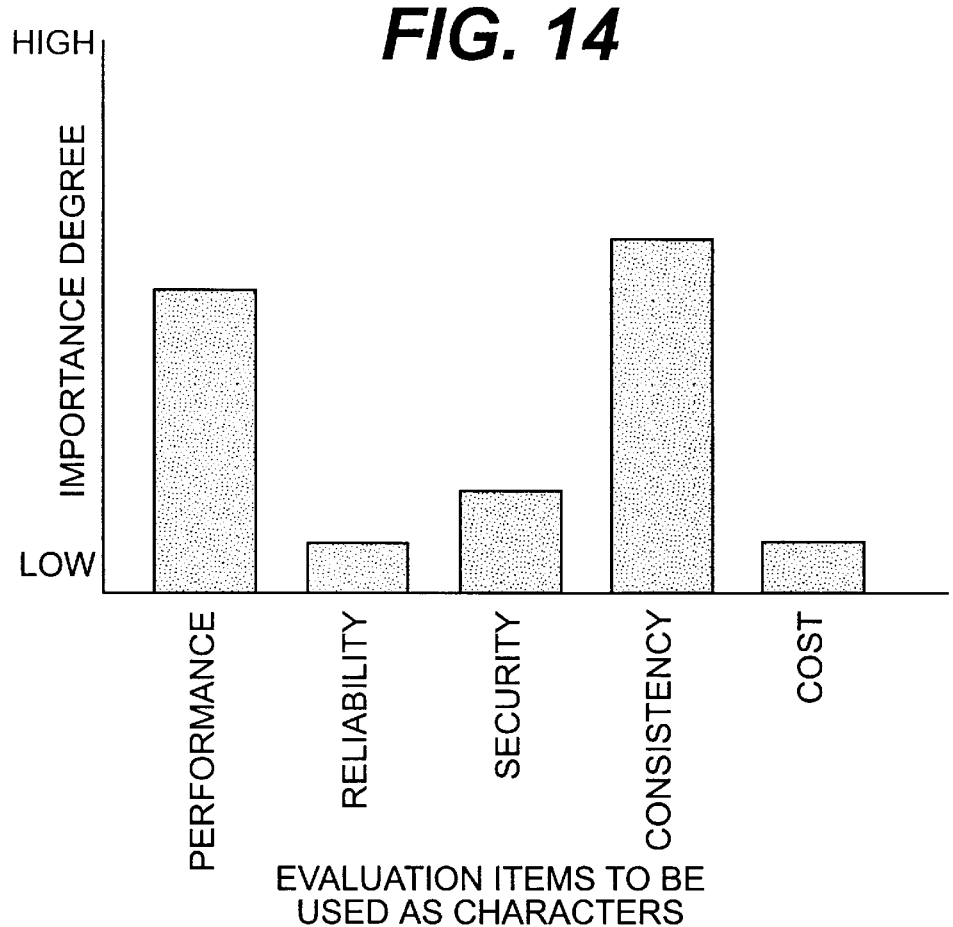
FIG. 14 is a diagram showing an example of characteristics which an allocation result should have.

The worker responsible for building the client-server system enters the characteristics which the allocation result should have, such as those shown in FIG. 14, from the characteristic input means 11 (step 1001 in FIG. 2). FIG. 14 shows the evaluation items (performance, reliability, security, consistency, cost, etc.) to be regarded as the characteristics of the client-server system as well as the importance to be assigned to each item.

Figure 15:
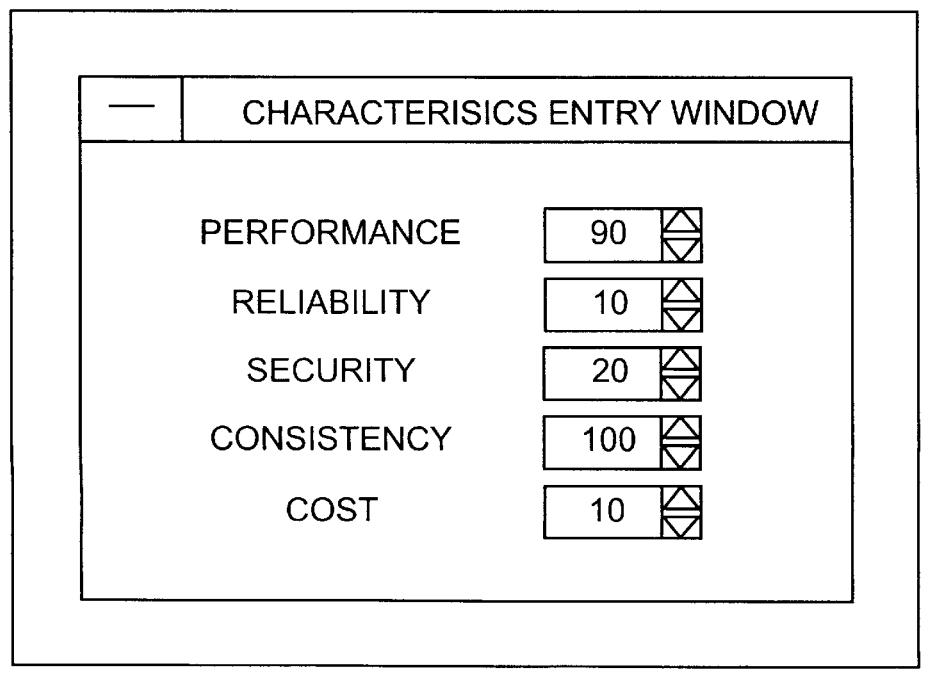
FIG. 15 is a diagram showing an example of the characteristic input means in the first embodiment.

The characteristic input means 11 is implemented by the keyboard, mouse, and other input means. FIG. 15 shows an example of the characteristic input means. FIG. 15 shows an example of an interactive input means which uses the graphical user interface. Although the characteristics are represented using graphs in this embodiment, any other representation formats may be used provided that the same information may be represented. Similarly, any other input means may be used provided that the same information may be entered. And, the items used to represent characteristics need not necessarily be the same as those used in this embodiment, nor must all the items used in this embodiment be used.

(3) Allocation Means 13

The allocation means 13 allocates the objects, such as processes and databases, based on the information entered from the problem input means 10 and characteristic input means 11 (step 1004 in FIG. 2).

(3-1) Semi-optimization Algorithm

The solution the allocation means 13 uses must have an ability that allows the worker responsible for building a client-server system to do his task interactively. In general, a problem which finds an allocation result belongs to the combinatorial optimization problem. The solutions for the above problem are classified roughly into two types of algorithm. One is the semi-optimization algorithm which does not give us the strictly-optimized solution but gives us a effective solution quickly. The other is the optimization algorithm which takes very long but gives us the strictly-optimized, effective solution. This embodiment, which is interactive as described above, uses the semi-optimization algorithm which generates a solution quickly. In addition, this embodiment uses the genetic algorithm as the semi-optimization algorithm.

The optimization problem solution through the genetic algorithm is described, for example, in "Genetic Algorithms in Search, Optimization and Machine Learning" or is disclosed in Japanese Non-Examined Patent Publication 4-281550 or 6-68058. In this genetic algorithm, the set P of N vectors (V1, V2, . . . , Vn) is entered as the input value. Each element of P indicates a solution for the given problem, and P is called a solution group. The algorithm repeats a cycle in which a sequence of operations "selection, crossover, and mutation" are performed.

That is, the algorithm first evaluates how well each element of P satisfies the requirement (fitness) according to the given evaluation criteria and generates the output as an evaluation value. Then, according to the obtained evaluation value, the algorithm removes less satisfactory solutions from, and adds the same number of satisfactory solutions to, the solution group P. The result is that the solution set P includes more satisfactory (high fitness) elements. This operation is called "selection". The algorithm then performs "crossover" and "mutation", which are described below, for a plurality of solutions which are the survivors of selection to generate the new next-generation solution group. Here, the initial solution group refers to the solution group initially provided when the cycle "selection, crossover, and mutation" begins.

The algorithm performs the crossover operation. It first pairs randomly-selected two solutions and exchanges some components (generally called genes) between the paired solutions. For example, when one of the paired solutions consists of a permutation of "D E A B C" and the other solution consists of "A EB C D", some of the components (underlined ones) are exchanged to generate new two solutions "D E B B C" and "A E A C D". One well-known crossover method, called PMX, is described in the above-mentioned publication; it is not described here because it is outside the scope of the present invention.

Next, the algorithm performs the mutation operation. It selects some solutions from the solution group P with a little probability and, for each selected solution, changes some of its components. A well-known mutation operation method is that two components are selected randomly from each solution vector and its components are exchanged. For example, when a permutation of "D E AB C" is selected from the solution group P, some components (underlined ones) are exchanged to generate a new solution "DB A E C".

For the next-generation solution group thus obtained, the genetic algorithm repeats a sequence of operations (selection, crossover, and mutation). In this manner, each solution in the solution group P converges to a semi-optimization solution.

Although this embodiment uses the genetic algorithm, any other algorithm may be used provided that the same effect is obtained. A solution in this embodiment means an allocation result which determines the allocation of the processes or tables in a client-server system to be built.

(3-2) Details About Allocation Means 13

Figure 16:
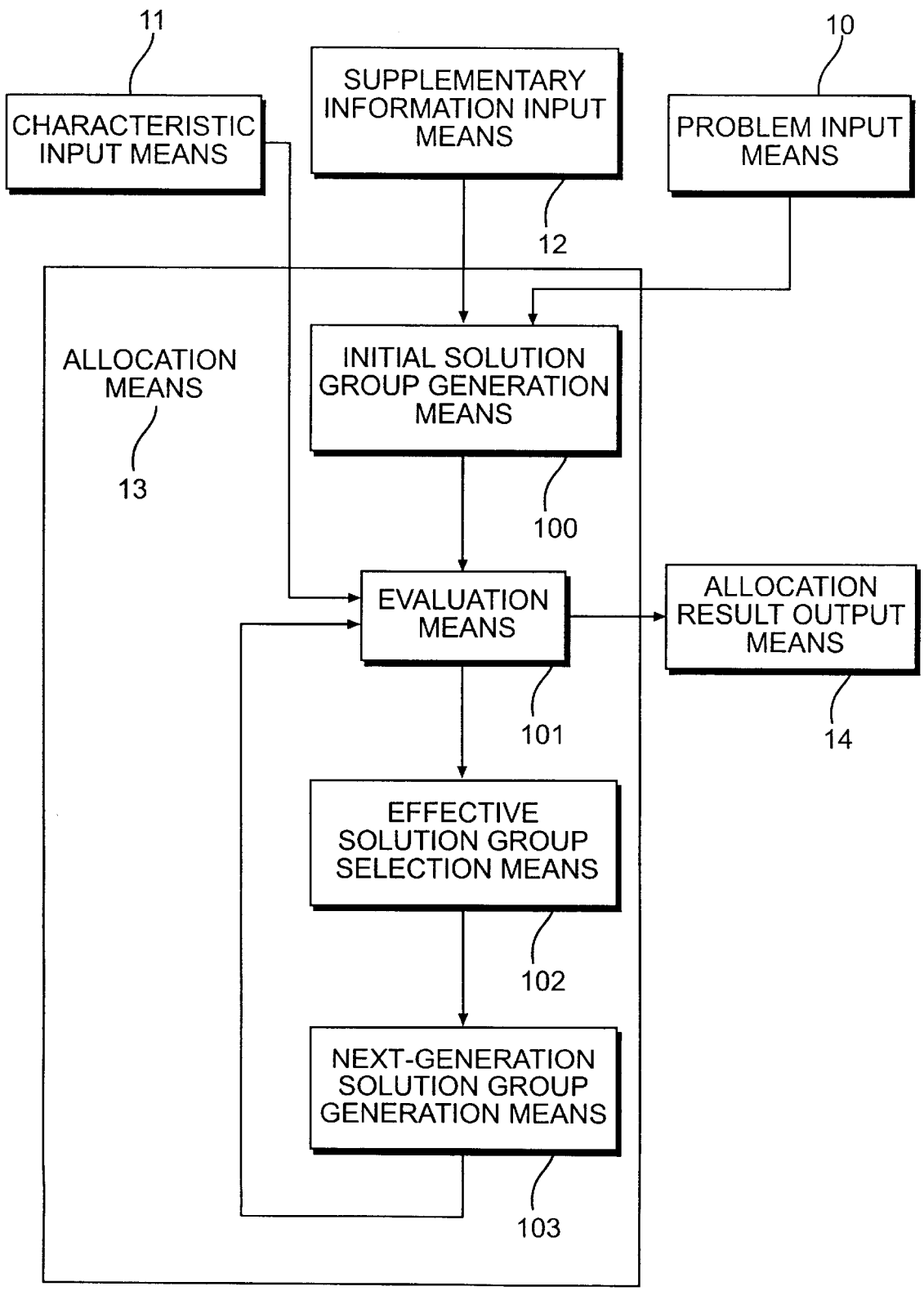
FIG. 16 is the detailed configuration diagram of the allocation means 13 in the first embodiment.

The following details the allocation means 13 with reference to FIG. 16.

The allocation means 13 uses the above-mentioned genetic algorithm. The allocation means 13 comprises the initial solution group generation means 100, evaluation means 101, effective solution group selection means 102, and next-generation solution group generation means 103. The initial solution group generation means 100 generates an initial solution group, necessary at the beginning of the initial search, according to the problems entered from the problem input means 10, and the supplementary informations entered from the supplementary information input means 12 which will be described later. The evaluation means 101 evaluates each solution and determines whether or not the search is canceled. The effective solution group selection means 102 selects an effective solution with priority. The next-generation solution group generation means 103 generates the next generation.

Figure 17:
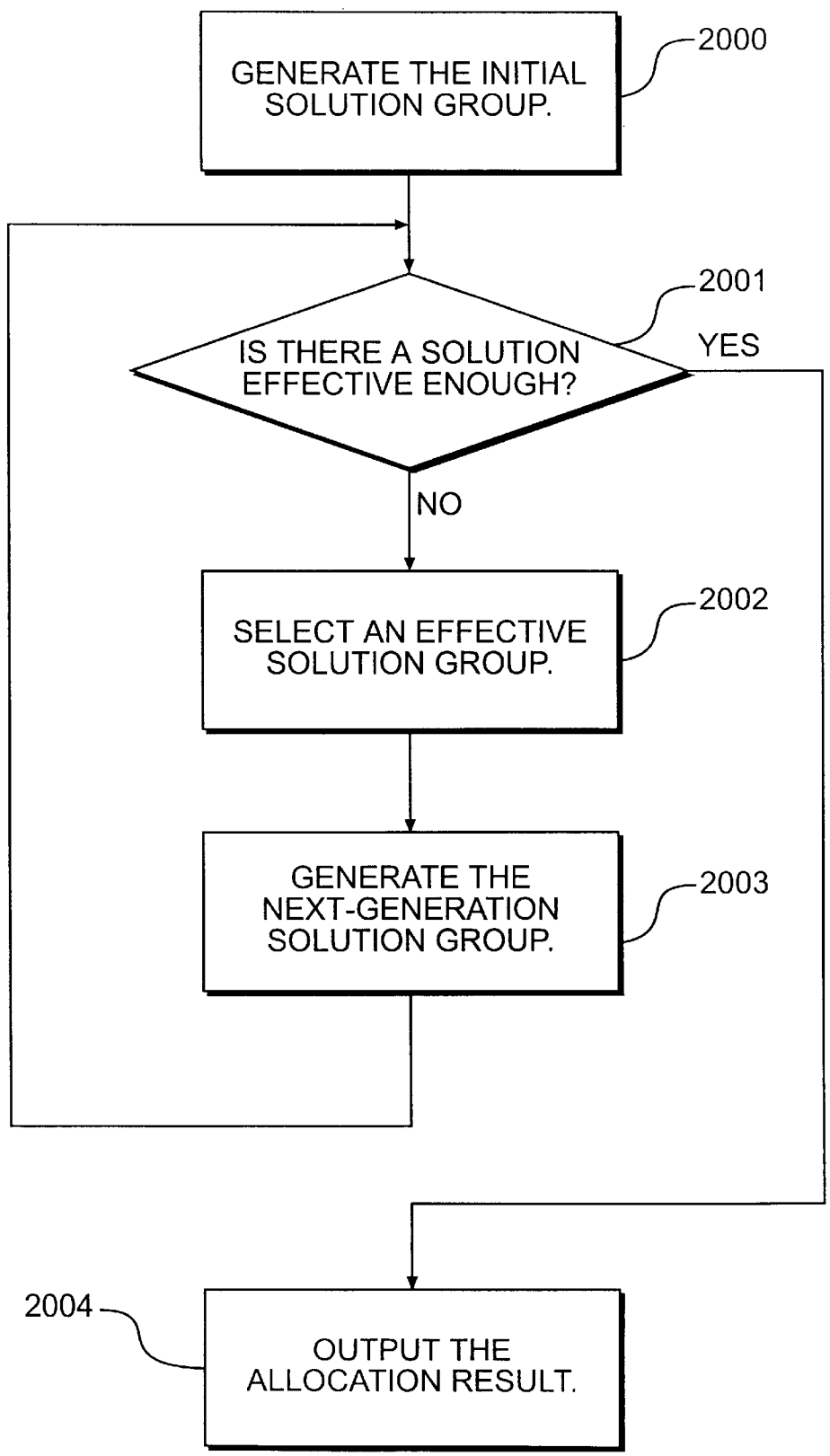
FIG. 17 is the flowchart showing the process flow of the allocation means 13 in the first embodiment.

The following explains the operation of the allocation means 13 with reference to FIG. 17:

First, the initial solution group generation means 100 generates an initial solution group, a set of a plurality of initial solutions satisfying the each condition entered from the problem input means 10 (step 2000 in FIG. 17). At this time, when there are some supplementary informations entered from the supplementary information input means 12, the initial solution group generation means 100 processes the solutions in the generated initial solution group so that they follow the informations. The evaluation means 101 checks each of a plurality of solutions against the information entered from the characteristic input means 11 and evaluates if each solution is effective enough (step 2001 in FIG. 17). When there is a solution that is effective enough, the evaluation means 101 outputs it to the allocation result output means 14 (step 2004 in FIG. 17) and cancels the search. When there is no solution that is effective enough, the means selects from a plurality of solutions only those solutions that are relatively effective (step 2002 in FIG. 17).

Although this embodiment uses the roulette method in which solutions are selected at a probability proportional to the effectiveness (fitness), any other method may be used provided that solutions are selected in the same manner. Next, the means generates the next-generation solution group based on the selected solution group (step 2003 in FIG. 17). In this embodiment, two types of operation, crossover and mutation, are performed; the crossover operation selects two solutions with a given probability and exchanges some genes between them, while the mutation operation changes some genes with a given probability. Although the crossover operation and mutation operation are performed in this embodiment to generate the next-generation solution group, any other operations may be used provided that they generate a solution group different from the previous-generation solution group. After generating the next-generation solution group, the evaluation means 101 evaluates the solutions, again.

(3—3) Evaluation Means 101

Figure 18:
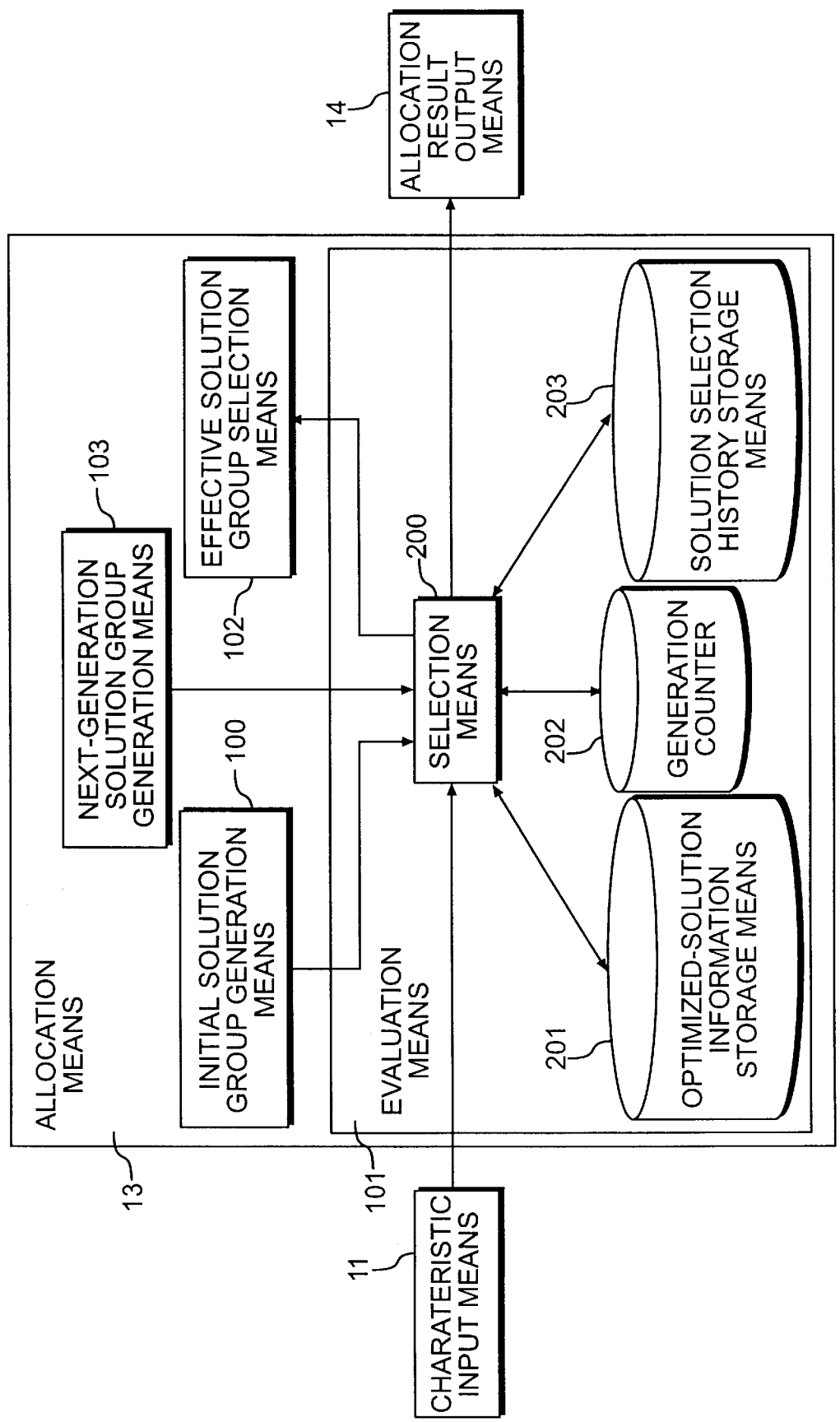
FIG. 18 is the detailed configuration diagram of the evaluation means 101 in the first embodiment.

The following explains the evaluation means 101 with reference to FIG. 18.

The evaluation means 101 comprises the selection means 200, optimized-solution information storage means 201, generation counter 202, and solution selection history storage means 203. The selection means 200 selects the solution which is considered to be the most effective one from a plurality of solutions, taking into consideration the characteristic information entered from the characteristic input means 11. The optimized-solution information storage means 201 stores the solution which is considered to be the most effective solution out of the solutions that have been checked. The generation counter 202 contains the number of generations that have been checked. The solution selection history storage means 203 contains the solution which is considered to be the most effective one selected by the selection means 200 and the generation number of that solution.

Figure 19:
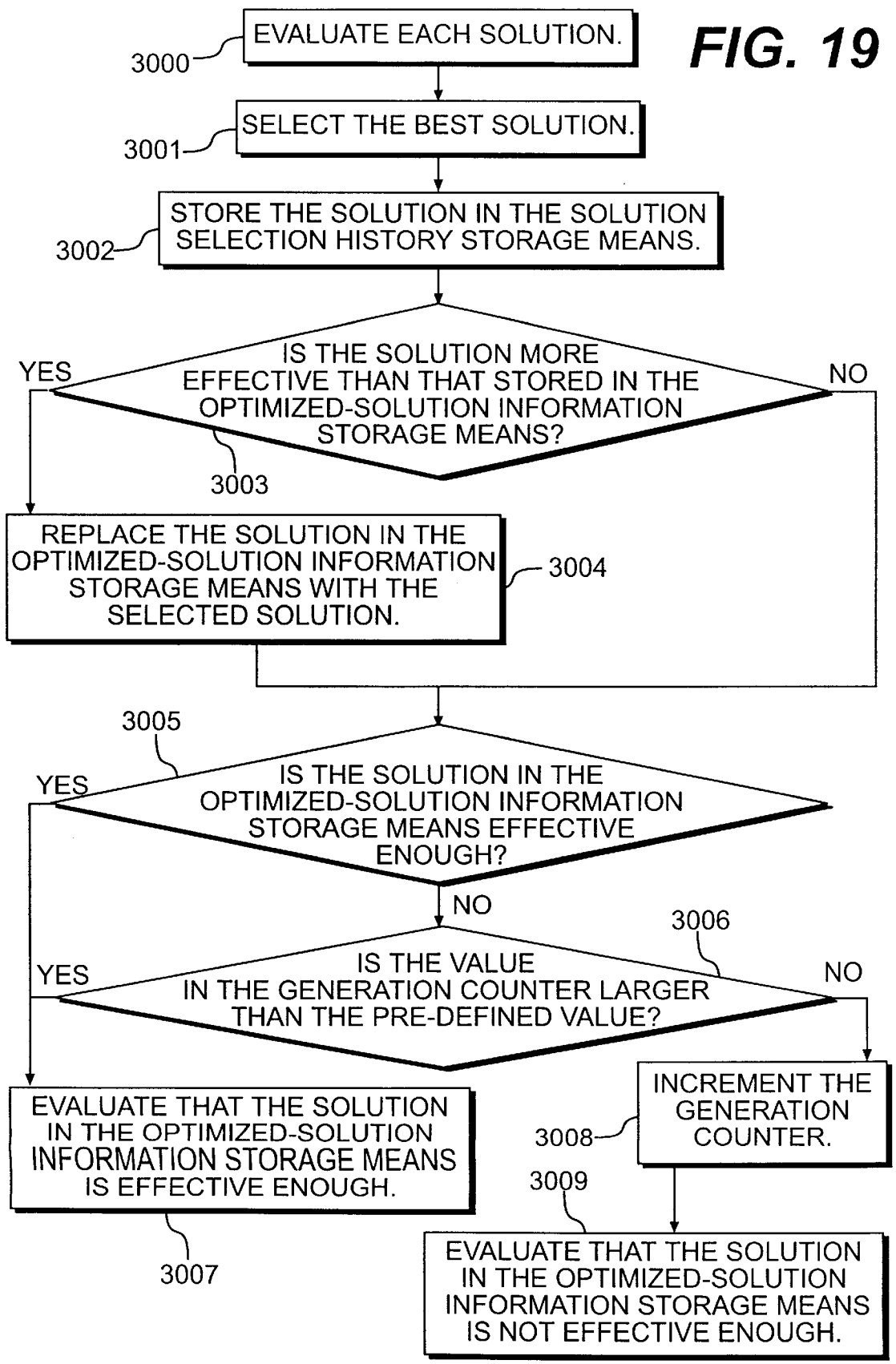
FIG. 19 is the flowchart showing the process flow of the evaluation means 101 in the first embodiment.

The following explains how the evaluation means 101 operates with reference to FIG. 19.

First, the selection means 200 evaluates each solution entered from the initial solution group generation means 100 or next-generation solution group generation means 103 while taking into consideration the characteristic information entered from the characteristic input means 11 (step 3000 in FIG. 19), and then selects one solution which is most highly evaluated (step 3001 in FIG. 19). The evaluation method will be described later. The selection means 200 stores the selected solution and the generation number of the solution in the solution selection history storage means 203 (step 3002 in FIG. 19).

Next, the selection means 200 checks the selected solution if it is more effective than the solution stored in the optimized-solution information storage means 201 (step 3003 in FIG. 19). If the means finds that the selected solution is more effective, it replaces the solution in the optimized-solution information storage means 201 with the selected solution (step 3004 in FIG. 19).

If the means finds that the solution stored in the optimized-solution information storage means 201 is effective enough (step 3005 in FIG. 19), or if the number of the generation held in the generation counter 202 is larger than the pre-defined value (step 3006 in FIG. 19), then the selection means 200 evaluates that the solution stored in the optimized-solution information storage means 201 is considered to be the solution that is effective enough (step 3007 in FIG. 19) and outputs it to the allocation result output means 14.

If the means does not find that the solution stored in the optimized-solution information storage means 201 is effective enough, and if the number of the generation stored in the generation counter 202 is smaller than the pre-defined value, then the means increments the number of the generation held in the generation counter 202 (step 3008 in FIG. 19), evaluates that the solution is not the one that is effective enough (step 3009 in FIG. 19), and causes the effective solution group selection means 102 to select the solution group for the next generation.

Figure 20:
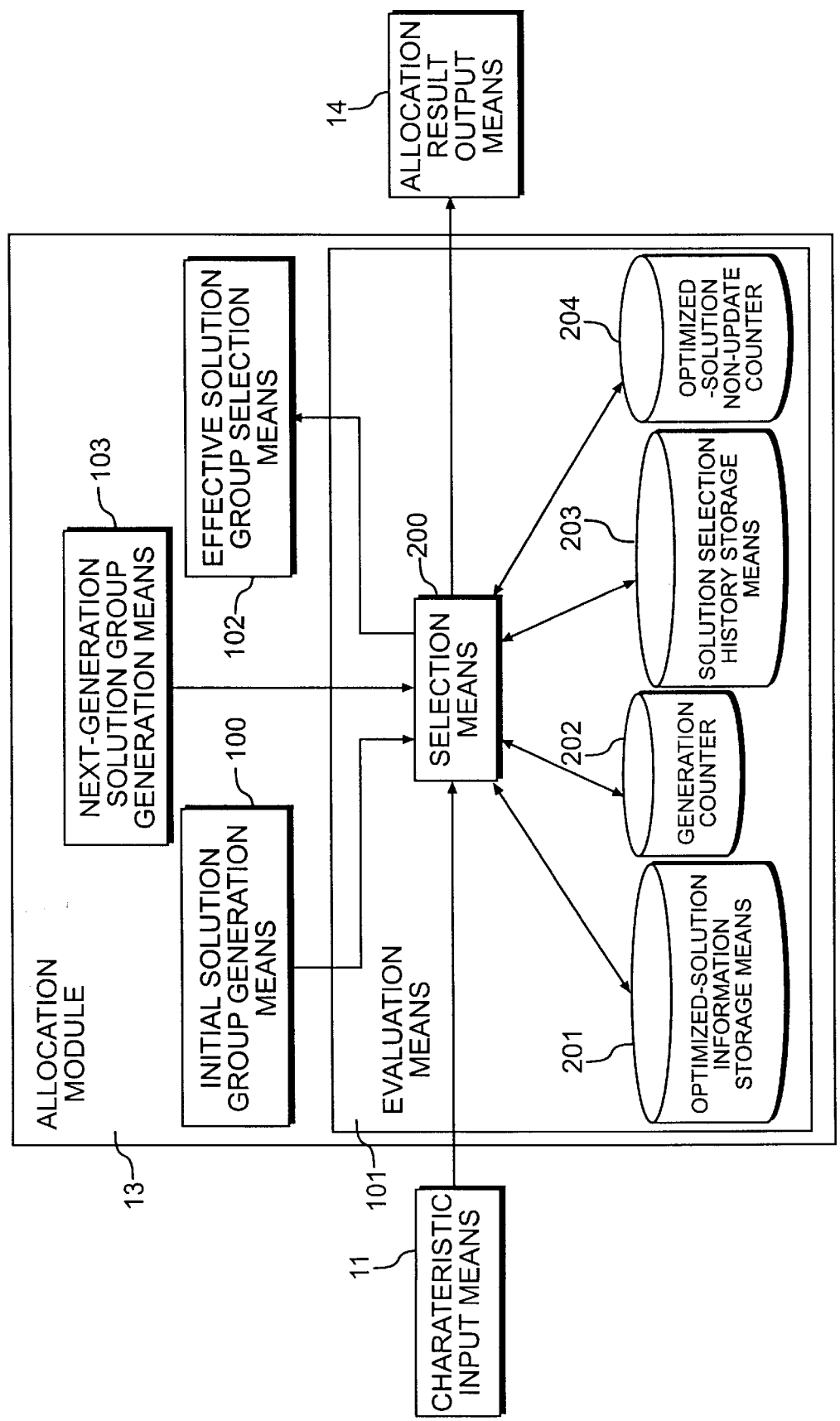
FIG. 20 is the detailed configuration diagram of the another evaluation means 101.

FIG. 20 shows another example of the evaluation means 101. The evaluation means 101 comprises the optimized-solution non-update counter 204. The optimized-solution non-update counter 204 contains the number of generations during which the optimized-solution has not been updated since it was last stored in the optimized-solution information storage means 201.

Figure 21:
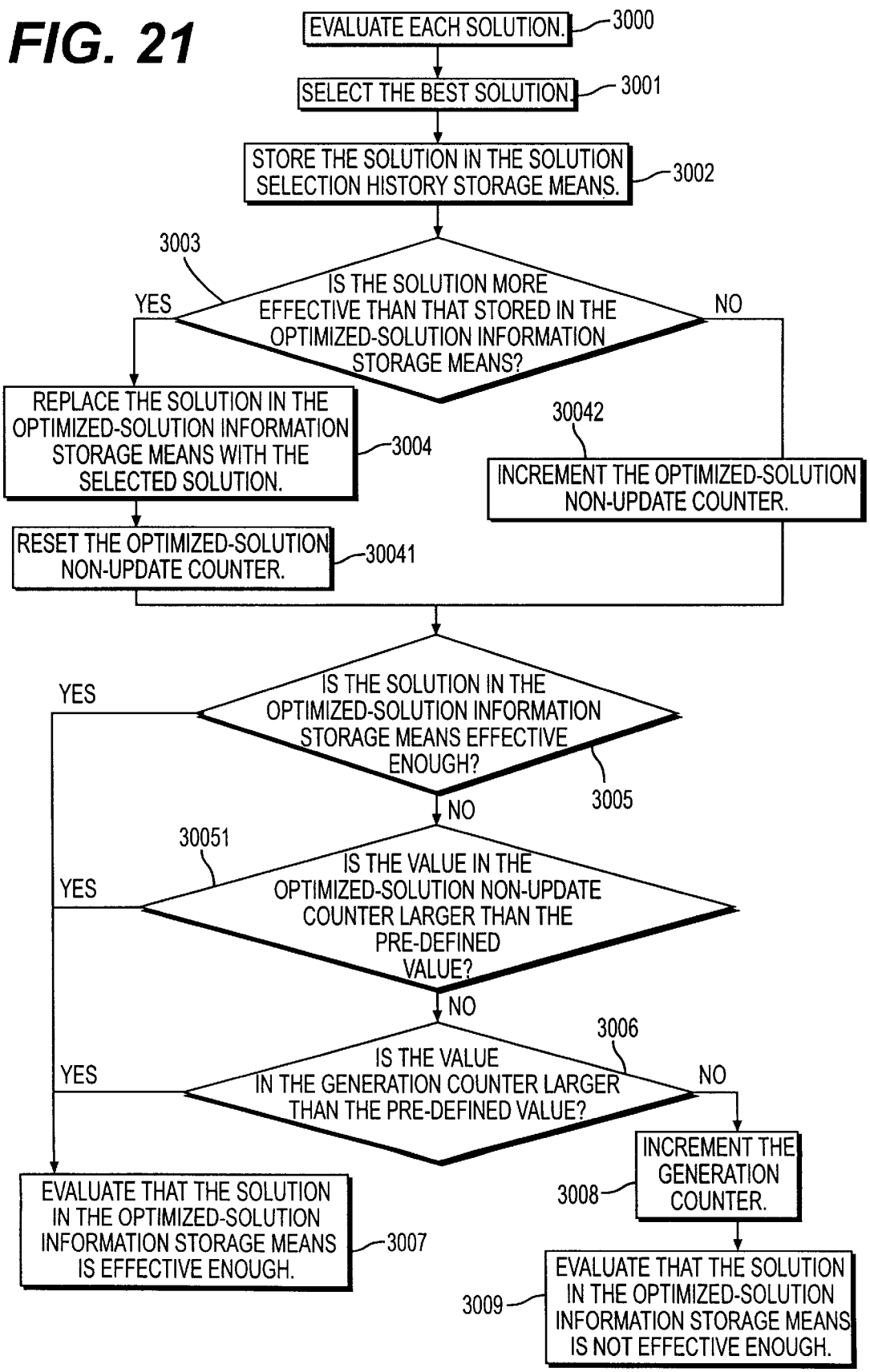
FIG. 21 is the flowchart showing the process flow of the evaluation means 101 in FIG. 20.

The following explains how this evaluation means 101 operates with reference to FIG. 21.

In this case, if the selection means 200 finds that the selected solution is more effective than the solution stored in the optimized-solution information storage means 201, then the selection means 200 resets the optimized-solution non-update counter 204 (step 30041 in FIG. 20) while it replaces the solution in the optimized-solution information storage means 201 with the selected solution (step 3004 in FIG. 20).

If the selection means 200 finds that the selected solution is less effective than the solution stored in the optimized-solution information storage means 201, it increments the value in the optimized-solution non-update counter 204 (step 30042 in FIG. 20).

If the means finds that the solution stored in the optimized-solution information storage means 201 is not effective enough (step 3005 in FIG. 20), it checks if the number of the generation stored in the optimized-solution non-update counter 204 is larger than the pre-defined value (step 30051 in FIG. 20). Thus if it is, then the selection means 200 evaluates that the solution stored in the optimized-solution information storage means 201 is considered to be the solution that is effective enough (step 3007 in FIG. 20). And if it is not, then the selection means 200 checks if the number of the generation held in the generation counter 202 is larger than the pre-defined value (step 3006 in FIG. 20).

It is noted that the developer of the network-computer system build support system defines the values that are compared with the generation counter 202 and the optimized-solution non-update counter 204 when he develops the system.

(3-4) Evaluation Method

In this embodiment, the selection means 200 evaluates each solution as follows:

First, the means calculates the performance evaluation PFM from the communication bottleneck CBT and the synchronous update bottleneck SBT as follows:

[Formula 1]

$$PFM = \sqrt{CBT \times SBT} \quad (1)$$

The means finds the rate of the ideal processing time to the expected processing time for each transaction, and assigns the geometrical mean of all the transaction rates to CBT.

The means finds the ideal processing time IDL[tr] of a transaction tr using the formula shown below. In the formula, PRC[tr] represents a set of processes which make up the transaction tr, and TBL[p] represents a set of tables which the process p accesses. The notation of a set surrounded by vertical bars (|) indicates the size of the set.

[Formula 2]

$$IDL[tr] = |PRC[tr]| + \sum_{p \in PRC[tr]} |TBL[p]| \quad (2)$$

The expected processing time EST[tr][en] of the transaction tr entered from the node en is calculated as follows:

First, for the interval between neighboring two nodes n1 and n2, the communication delay DLY[n1][n2] is calculated, where JAM[n1][n2] indicates the degree of jam between the nodes. The degree of jam may also be obtained from the shape of the line in the graph connecting the nodes. For a path between two different nodes, the degree of jam indicates the number of times the particular interval (between two nodes) occur for all the combinations of the nodes. MDA[n1][n2], which represents the communication medium of the interval, is calculated as the rate for the fastest communication medium.

[Formula 3]

$$DLY[n_1][n_2] = \frac{JAM[n_1][n_2]}{MDA[n_1][n_2]} \quad (3)$$

Next, the expected processing time EXE[pn][p] of a process (p) assigned to a node (pn) is calculated using the formula shown below. In the formula, PT[p] indicates the set of tables required by the process p and TN[t] represents the set of nodes to which the table t is allocated.

[Formula 4]

$$EXE[pn][p] = \sum_{t \in PT[p]} \left( \min_{t \in TN[t]} \left( \sum_{(n_1,n_2) \in (pn,tn)} DLY[n_1][n_2] \right) \right) \quad (4)$$

Then, for the transaction tr entered from the node en, the expected processing time EXE[tr][en] is calculated using the formula shown below. In the formula, TP[tr] represents the set of processes constituting the transaction tr and PN[p] represents the set of nodes to which the process p is allocated.

[Formula 5]

$$EST[tr][en] = \quad (5)$$
$$\sum_{p \in TP[tr]} \left( \min_{pn \in PN[p]} \left( \sum_{(n_1,n_2) \in (en,pn)} DLY[n_1][n_2] + EXE[pn][p] \right) \right)$$

Then, the communication bottleneck CBT is calculated using the formula shown below. In the formula, TRN represents the set of transactions and EN[tr] represents the set of nodes from which the transaction tr is entered.

[Formula 6]

$$CBT = {}_{|TRN|}\sqrt{\prod_{tr \in TRN, en \in EN|tr|} \frac{IDL[tr]}{EST[tr][en]}} \quad (6)$$

Next, the rate of the number of synchronous copies to the number of asynchronous copies is calculated for all the tables using the formula shown below, and the result is assigned to SBT. In the formula, SNC represents the set of synchronous copies and ASNC represents the set of asynchronous copies.

[Formula 7]

$$SBT = \frac{1 + |ASNC|}{1 + |ASNC| + |SNC|} \quad (7)$$

Next, the evaluation for reliability REL is calculated using the formula shown below. In the formula, ENT represents the set of tables existing as entities, SNC represents the set of tables existing as synchronous copies, ASNC represents the set of tables existing as asynchronous copies, TBL represents the set of all the tables, and NOD represents the set of all the nodes.

[Formula 8]

$$REL = \frac{(|ENT| + |SNC|) \times 2 + |ASNC|}{|TBL| \times |NOD| \times 2} \quad (8)$$

In addition, the evaluation of security SEC is calculated from the security for processes PSEC and the security for tables TSEC, using the formula shown below.

[Formula 9]

$$SEC = \sqrt{PSEC \times TSEC} \quad (9)$$

First, the unauthorized access risk possibility PRSK[p] of the process p is calculated using the formula shown below. In the formula, PN[p] represents the set of nodes to which the process p is allocated and RSK[pn] represents the probability with which the node pn may be accessed incorrectly.

[Formula 10]

$$PRSK[p] = \frac{\sum_{pn \in PN[p]} RSK[pn]}{|PN[p]|} \quad (10)$$

Then, the security for processes PSEC is calculated using the formula shown below. In the formula, PRC represents the set of all the processes.

[Formula 11]

$$PSEC = 1 - \frac{\sum_{p \in PRC} PRSK[p]}{|PRC|} \quad (11)$$

In addition, the unauthorized access risk possibility TRSK[t] of the table t is calculated using the formula shown below.

In the formula, TN[t] represents the set of nodes to which the table t is allocated.

[Formula 12]

$$TRSK[t] = \frac{\sum_{tn \in TN[t]} RSK[tn]}{|TN|} \quad (12)$$

Then, the security for tables TSEC is calculated using the formula shown below. In the formula, TBL represents the set of all the tables.

[Formula 13]

$$TSEC = 1 - \frac{\sum_{t \in TBL} TRSK[t]}{|TBL|} \quad (13)$$

In addition, the evaluation for consistency CON is calculated using the formula shown below. In the formula, ASNC[t] represents the set of tables assigned to the table t as asynchronous copies and TBL represents the set of all the tables.

[Formula 14]

$$CON = \frac{\sum_{t \in TBL} \frac{1}{1 + |ASNC[t]|}}{|TBL|} \quad (14)$$

Finally, the evaluation for costs CST is calculated using the formula shown below. In the formula, CPY[t] represents the set of tables existing as synchronous copies or asynchronous copies of the table t, TBL represents the set of all the tables, and NOD represents the set of all the nodes.

[Formula 15]

$$CST = \frac{\sum_{t \in TBL} \frac{|CPY[t]|}{|NOD| - 1}}{|TBL|} \quad (15)$$

The evaluation "fitness" for each solution is calculated for the values obtained by the above formulas (1), (8), (9), (14), and (15), with information entered from the characteristic input means 11 as the weight. In the following formula, "weight" represents a weight function, $C_{PFM}$ represents the weight for performance, $C_{REL}$ represents the weight for reliability, $C_{SEC}$ represents the weight for security, $C_{CON}$ represents the weight for consistency, and $C_{CST}$ represents the weight for costs.

[Formula 16]

$$\text{fitness} = \text{weight}(PFM, c_{PFM}) \times \\ \text{weight}(REL, c_{REL}) \times \\ \text{weight}(SEC, c_{SEC}) \times \\ \text{weight}(CON, c_{CON}) \times \\ \text{weight}(CST, c_{CST}) \quad (16)$$

Although the above formulas are used in this embodiment, any other formulas or any other established methods without formulas may be used provided that the same evaluation is given.

As described above, when determining how effective each solution is, the selection means 200 treats the allocation problem as a more relaxed allocation problem, not as an allocation problem only for building a client-server system. This allows the developer of the network-computer system build support system to create the system easier. As a result, the worker who is going to build a client-server system with the use of the allocation means 13 is able to get an effective allocation result quickly, though it is not strictly optimized.

(4) Allocation Result Output Means 14

Next, the allocation result output means 14 outputs allocation results, such as those shown in FIGS. 22 and 23 produced by the allocation means 13 (step 1005 in FIG. 2). FIG. 22 and 23 represent the allocation result of objects to be allocated when building a client-server system. A display unit such as a CRT unit or a printer is used as the allocation result output means. FIGS. 24 and 25 show an example of display by the allocation result output means. FIGS. 24 and 25 represent an example of output means using the graphical user interface. Although the allocation result is shown in the table format in a relational database in this embodiment, any other display format may be used provided that the same information is represented and any other output means may be used provided that the same information is output. Similarly, the items represented as allocation results need not necessarily those used in this embodiment, nor must all the items of this embodiment be used.

(5) Judgment Result Input Means 15

Figures 26, 27:
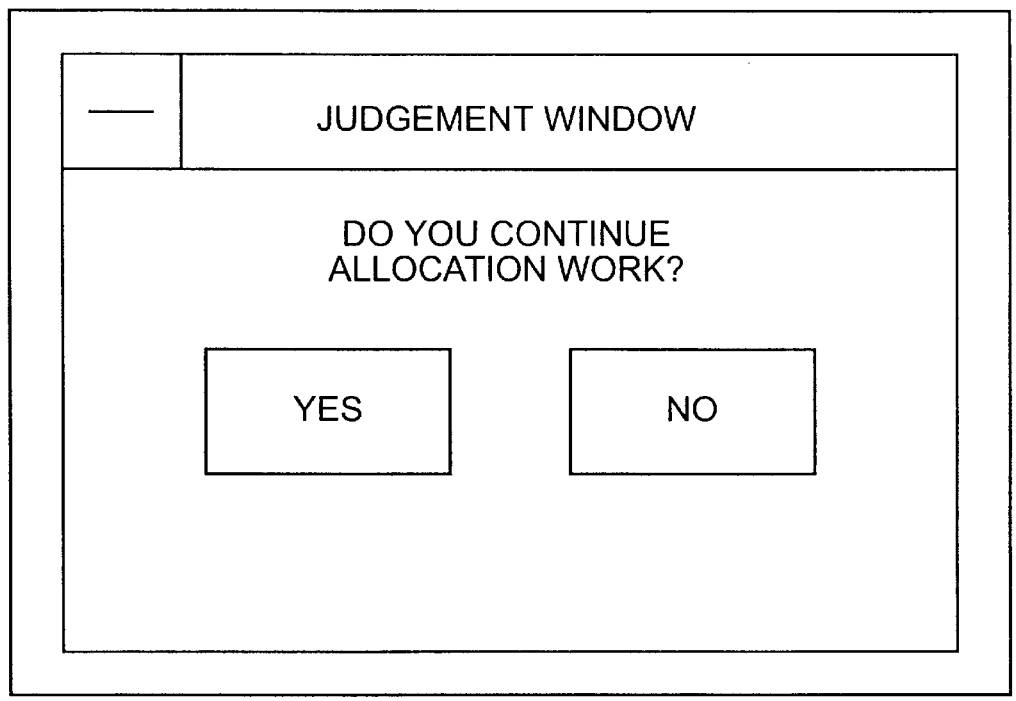
FIG. 26 is a diagram showing an example of the judgment result input means in the first embodiment.
FIG. 27 is a diagram showing an example of final allocation results.

Next, the worker who is to build a client-server system checks the allocation result displayed by the allocation result output means 14, and uses the judgment result input means 15 to determine whether to continue the allocation operation (step 1006 in FIG. 2). The judgment result input means 15 comprises the input means such as the keyboard or mouse. FIG. 26 shows an example of judgment result input means. FIG. 26 shows an example of judgment result input means which uses the graphical user interface. Although the judgment means which uses the graphical user interface is used in this embodiment, any other means may be used if the worker can judge the result in the same manner.

(6) Final Allocation Result Output Means 16

The worker who is to build a client-server system checks the output from the allocation result output means 14 and, when he judges that the allocation work must be continued, enters an instruction from the judgment result input means 15 to continue the allocation work. This causes the supplementary information input means 12, which will be described later, to be started. The worker enters supplementary informations from this supplementary information input means 12 to repeat the work to find an effective allocation as described above.

When the worker satisfies the output and judges that the allocation work should be ended, the allocation result is output from the final allocation result output means 16 as the final allocation result, as shown in FIG. 27 or 28 (step 1007 in FIG. 2). FIGS. 29 and 30 show some examples of the result displayed on the final allocation result output means. FIGS. 29 and 30 show examples displayed on the output means which use the graphical user interface.

Although the final allocation result is represented using the format of a table in a relational database in this embodiment, any other representation formats may be used provided that the same information is represented and any other output means may be used provided that the same information is output. And, the items used to represent a final allocation result need not necessarily be the same as those used in this embodiment, nor must all the items of this embodiment be used.

(7) Supplementary Information Input Means 12

As described above, the supplementary information input means 12 is started when the worker who is to build a client-server system starts allocation, and when the worker checks the allocation result and judges that the allocation work should be continued. If there is some information useful to get a more effective allocation (step 1002 in FIG. 2) in addition to the information entered from the problem input means 10, the worker who is to build a client-server system is able to enter information from the supplementary information input means 12 shown in FIG. 29 or 30 (step 1003 in FIG. 2).

FIGS. 31 and 32 show some of the allocation results that are given as supplementary informations when a client-server system is built. FIG. 31 shows supplementary informations which indicate that process 1 should always be allocated to node 1 and that process 4 should never be allocated to node 2, and so forth. FIG. 32 shows supplementary informations which indicate that the synchronous copy of the entity of table 2 should be allocated to node 1 and that the entity of table 1 should be allocated to node 2 and so forth.

The supplementary information input means 12 comprises the input means such as the keyboard or mouse. FIGS. 33 and 34 show some examples of the supplementary information input means. FIGS. 33 and 34 show some examples of interactive input means which use the graphical user interface. The contents of the matrixes in FIGS. 33 and 34 are used as supplementary informations.

Although supplementary informations are represented using the format of a table in a relational database in this embodiment. any other representation formats may be used provided that the same information is represented and any other input means may be used provided that the same information is entered. And, information that is given as supplementary informations need not necessarily be the same as those used in this embodiment, nor must all the information specified as supplementary informations in this embodiment be used.

Figure 35:
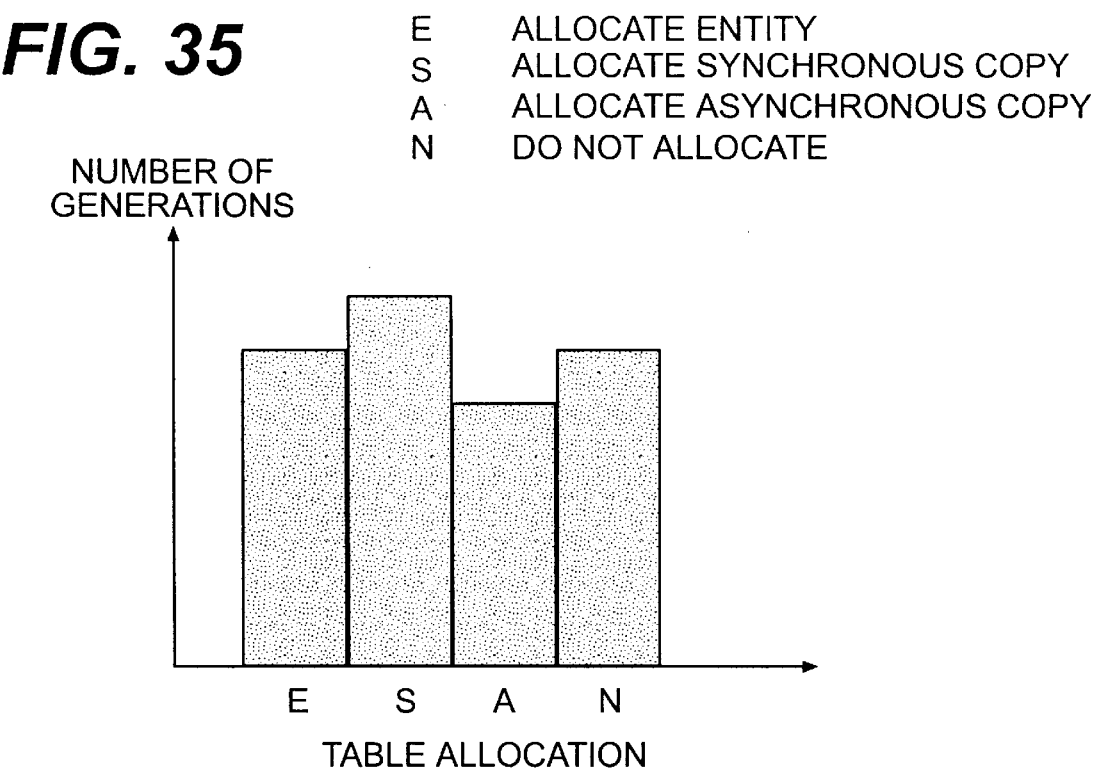
FIG. 35 is a histogram showing the distribution of allocation types of process-table combinations.

Another function of the supplementary information input means 12 is that, before the worker enters supplementary informations, the means finds the nodes to which supplementary informations are to be given. The supplementary information input means 12 references the solution selection history storage means 203, provided in the evaluation means 101, to find the nodes whose process or table allocation changes frequently over several generations. More specifically, the means searches the combinations of processes and nodes or the combinations of tables and nodes, such as those shown in FIGS. 29 and 30, for those combinations in which allocation changes frequently. An example of supplementary information used to determine the allocation includes information effective for searching for the allocation results, even though it may not be direct allocation information, the total number of specific processes, the upper or lower limit of the total number of specific tables, etc. The means searches for those combinations in one of the following two methods:

In the first method, the means creates a histogram showing the allocation for each process-node combination and table-node combination. FIG. 35 shows an example of histogram regarding the combination of a table and a node. FIG. 35 shows the frequency of generations for each type of table allocation shown in FIG. 30 (allocate an entity, allocate a synchronous copy, etc.). As shown in this figure, if the frequency of allocation type is distributed across a wide range, that is, if the allocation type changes frequently over several generations, then the combination of this table and node is thought of as being an unstable combination. Whether the distribution is wide or not is determined by the value which is calculated as its standard deviation.

Figure 36:
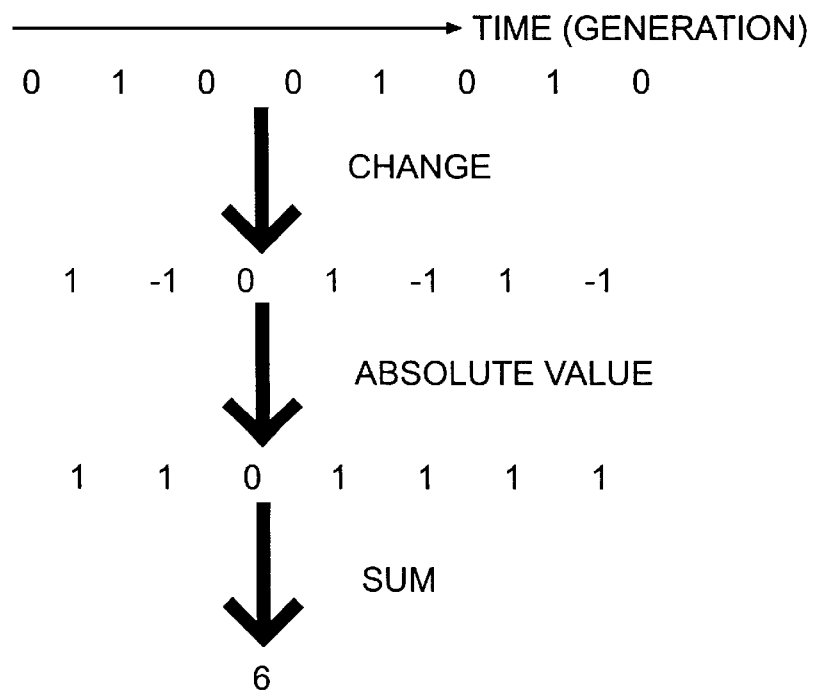
FIG. 36 is a diagram showing the time-series process-node allocation status.

In the other method, the allocation for each combination is arranged in the time-series manner, as shown in FIG. 36. In FIG. 36, the allocation status is represented in the time-series manner, where "1" indicates that a process is "allocated" to a node and "0" indicates that a process is "not allocated" to a node. The means finds the change amount for each transition from one generation to the next and calculates the absolute sum of the change amounts. If this sum is large, it is thought that the combination of the process and the node is an unstable combination. Whether the sum is large or not is determined, for example, in the following manner. If the sum exceeds 50% of the number of generations which are checked, then the sum is thought of as being large. The above two methods may be mixed to determine whether or not the process-node combination or table-node combination is stable.

On the contrary, the supplementary information input means 12 may search for the combination which has been stable over several generations. In this case, it judges whether the above distribution is narrow or not, or whether the above change amount is small or not. Furthermore, the supplementary information input means 12 may search for both the combination which has been unstable over several generations and the combination which has been stable over several generations.

The supplementary information input means 12 informs the worker, who is to build a client-server system, of the combinations detected as described above. For example, if the supplementary information input means 12 comprises the input means in the diagram format, then it displays a supplementary information-required combination in red; if the supplementary information input means 12 comprises the input means in the table format, then it surrounds a supplementary information-required combination cell with bold lines.

(8) Effect of the First Embodiment

As described above, this embodiment, with the use of the judgment result input means 15, provides the worker who is to build a client-server system with the ability to perform the quick allocation work repeatedly and, when he gets a satisfactory result, to end the allocation work. This allows the worker who is to build a client-server system to end the allocation work whenever he wants, thus speeding up the overall allocation work.

In addition, information necessary to get an effective allocation result may be entered from the supplementary information input means 12 when the worker judges that a further search is necessary to get a more effective allocation result. This makes it possible to get an effective allocation result quickly. And it should be noted that the supplementary informations to be entered from the supplementary information input means 12 need not necessarily be prepared when the problem is entered; new supplementary informations may be entered whenever the worker is not satisfied with the allocation result produced by the support system. For this reason, the worker can do the system build work flexibly based on his experience or knowledge.

In addition, the supplementary information input means 12 detects unstable combinations of a node and a process or unstable combinations of a node and a table, and informs the worker of those combinations, providing the worker with an opportunity to enter appropriate supplementary informations on them. That is, the worker is able to enter supplementary informations so that the genetic-algorithm-based search converges as quickly as possible. This makes it possible to get an effective allocation result still more quickly.

B. Second Embodiment

The following explains the second embodiment of the present invention with reference to the drawings. This embodiment corresponds to the inventions claimed in claims 9 to 12 and claim 20.

(1) Configuration of the Second Embodiment

Figure 37:
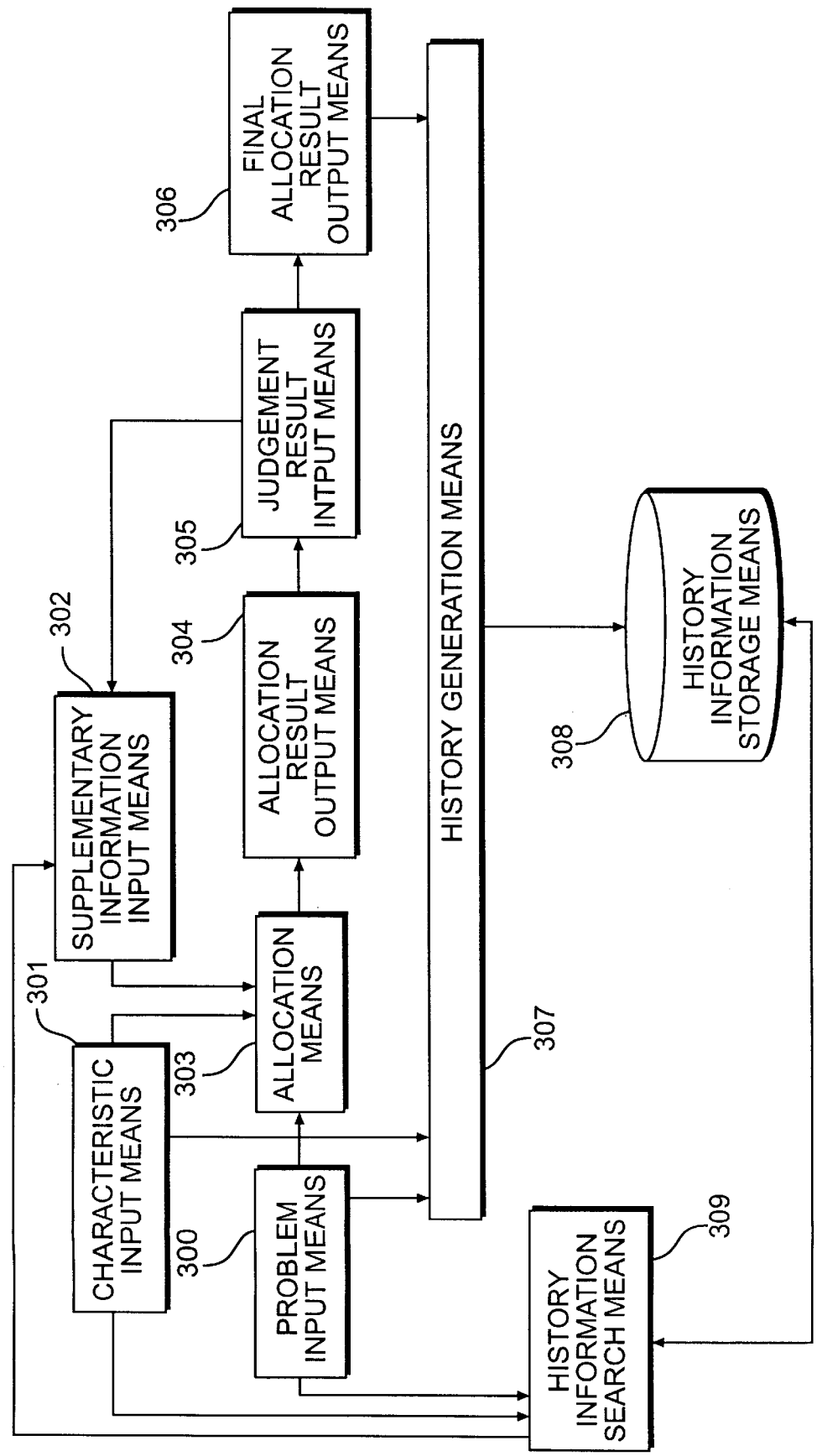
FIG. 37 is a diagram showing the overall configuration of the second embodiment of the network-computer system build support system according to this invention.

FIG. 37 shows the overall configuration of this embodiment. This embodiment comprises the history generation means 307, history information storage means 308, and history information search means 309 in addition to the problem input means 300, characteristic input means 301, supplementary information input means 302, allocation means 303, allocation result output means 304, judgment result input means 305, and final allocation result output means 306 which are provided in the first embodiment.

The history generation means 307 associates problems and characteristics, entered from the problem input means 300 and the characteristic input means 301, with the final allocation result output from the final allocation result output means 306, and generates history information. The history information storage means 308 stores history information generated by the history generation means 307. The history information search means 309 examines history information stored in the history information storage means 308 and, if there are history information having similar problems and/or characteristics generated in the past, sends information given from the allocation solutions included in the history information to the supplementary information input means 302.

(2) Operation of the Second Embodiment

As in the first embodiment, the worker who is to build a client-server system enters information necessary to build a client-server system, such as those shown in FIGS. 3, 4, 5, 6, 7, 8, 9, 10, 11, and 12, from the problem input means 300. (step 4000 in FIG. 38)

In addition, as in the first embodiment, the worker who is to build a client-server system enters characteristics to be assigned to the allocation result, such as those shown in FIG. 14, from the characteristic input means 301 (step 4001 in FIG. 38).

The history information search means 309 retrieves information stored in the history information storage means 308 using the information from the problem input means 300 and the characteristic input means 301 as the search key to determine if there were similar problems or characteristics in the past (step 4002 in FIG. 38). The means judges whether or not problems or characteristics are similar as follows:

(a) Judgment Via Configuration Management Information

As described above, a problem entered from the problem input means 300 consists of information on the topology of a specific client-server system or on the process and data to be allocated when building the client-server system. This type of information is similar to that entered in the past only when the present client-server system to be built is a succeeding version of a client-server system which was built in the past. The worker who is to build a client-server system enters the configuration management information such as a version number of the client-server system to be built from the problem input means 300.

So, when the history generation means 307 generates history information, it stores the configuration management information, such as a version number of the client-server system which is built, as well as the history information in the history information storage means 308. And, the history information search means 309 searches for the history information on the old version of the same type of the client-server system using the configuration management information on the new client-server system as the key.

(b) Judgment Via Characteristics Errors

The characteristic of a system entered from the characteristic input means 301 is similar to the characteristic of another system when the patterns of their evaluation items shown in FIG. 14 are similar. So, when allocating a client-server system, to determine whether or not the characteristics of two systems are similar, it is necessary, to normalize the characteristics entered from the characteristic input means 301 based on one of the items. For example, assume that there are evaluation items "performance", "reliability", and "cost" and that the characteristic is normalized with "performance." This means that, with the "performance" importance factor being "1", the means finds the importance factors of other items. For example, suppose that the "performance" importance factor is 10, that the "reliability" importance factor is 100, and that the "cost" importance factor is 20. Then, with the "performance" factor being 1, the "reliability" factor becomes 10 and the "cost" factor becomes 2.

Next, the means also normalizes the characteristics included in each history information stored in the history information storage means 308 with the use of "performance." For example, if the "performance" importance factor is 15, the "reliability" importance factor is 90, and the "cost" importance factor is 200, then the "reliability" factor becomes 6.67 and the "cost" factor becomes 1.33.

Then, for each of the other items (reliability and cost), the means finds the difference between the normalized value of each item in the history information storage means 308 and the normalized value of each item entered from the characteristic input means 301, and calculates the sum of the absolute value of each value. For example, the sum of the absolute values of the differences in the above example is calculated as:

[Formula 17]

$$e = |10 - 6.67| + |2 - 1.33| = 4 \quad (17)$$

This process is done for all the history informations stored in the history information storage means 308 to find the history information with the minimum sum e. This history information is thought of as being a similar history information.

Methods (a) and (b) described above are some examples to determine whether or not problems or characteristics are similar between any two history informations. Any other methods may be used if the similar judgment is done.

If there is a past history information whose problem or characteristic is similar to the current, the history information search means 309 outputs the final allocation result regarding the problem or the characteristic to the supplementary information input means 302 (step 4003 in FIG. 38). More specifically, when a history information whose problem is similar to the problem of the current-version, that is, an old-version client-server system, object is found using above-mentioned method (a), the history information search means 309 searches for the node-process combinations and the node-table combinations, which are found in both the old and new versions, and outputs their final result, obtained in the old version, to the supplementary information input means 302 for use as supplementary informations.

If a history information whose characteristic is similar to that of the current information is found using above-mentioned method (b), the history information search means 309, first, calculates the process allocation ratio and table allocation ration for the history information that was found. The allocation ratio of the process $\alpha_p (0 \leq \alpha_p \leq 1)$ is calculated, for example, by the following formula:

[Formula 18]

$$\text{Process allocation ratio } \alpha_p = \frac{\text{Number of process-node combinations actually allocated}}{\text{Number of processes} \times \text{Number of nodes}} \quad (18)$$

Next, the allocation ratio of the table $\alpha_t$ for the table that was found is calculated, for example, by the following formulas.

That is, the entity allocation probability $\alpha_t[0]$ is calculated by the following formula:

[Formula 19]

$$\text{Entity allocation probability } \alpha_t[0] = \frac{\text{Number of table-node combinations actually allocated as entity}}{\text{Number of tables} \times \text{Number of nodes}} \quad (19)$$

The synchronous copy allocation probability $\alpha_t[1]$ is calculated by the following formula:

[Formula 20]

$$\text{Synchronous copy allocation probability } \alpha_t[1] = \frac{\text{Number of table-node combinations actually allocated as synchronous copy}}{\text{Number of tables} \times \text{Number of nodes}} \quad (20)$$

The asynchronous copy allocation probability $\alpha_t[2]$ is calculated by the following formula:

[Formula 21]

$$\text{Asynchronous copy allocation probability } \alpha_t[2] = \frac{\text{Number of table-node combinations actually allocated as asynchronous copy}}{\text{Number of tables} \times \text{Number of nodes}} \quad (21)$$

The non-allocation probability $\alpha_t[3]$ is calculated by the following formula:

[Formula 22]

$$\text{Non allocation probability } \alpha_t[3] = \frac{\text{Number of table-node combinations actually not allocated}}{\text{Number of tables} \times \text{Number of nodes}} \quad (22)$$

The following formula is used:

[Formula 23]

$$0 \leq \alpha_t[k] \leq 1 \text{ And } \sum_{k=0}^{3} \alpha_t[k] = 1 \quad (23)$$

The supplementary information is generated using the allocation ratios above mentioned as follows. For example, suppose that processes $P_1$–$P_n$ are allocated to the node N. First, when the i-th process $P_i$ is allocated, the random number $\gamma (0 \leq \gamma \leq 1)$ is generated. Then, the allocation ratio $\alpha_p$ and the random number $\gamma$ are compared and, according to which one of them is larger, whether or not allocation is performed is determined as follows:

[Formula 24]

If $\gamma \leq \alpha_p$, process $p_i$ is allocated to the node N.

If $\gamma > \alpha_p$, process $p_i$ is not allocated to the node N. (24)

This processing is executed all the combinations of nodes and processes.

Also, suppose that tables $t_1$–$t_m$ are allocated to the node N. First, when the i-th table $t_i$ is allocated, the random number $\gamma(0 \leq \gamma \leq 1)$ is generated. And, the allocation ratio $\alpha_t$ and the random number $\gamma$ are compared to determine the following:

[Formula 25] (25)

If $0 \leq \gamma \leq \alpha_t[0]$, then table $t_i$ is allocated to node N as an eintity.

If $\alpha_t[0] < \gamma \leq \sum_{k=0}^{1} \alpha_t[k]$, then table $t_i$ allocated to node N as a synchronous copy.

If $\sum_{k=0}^{0} \alpha_t[k] < \gamma \leq \sum_{k=0}^{2} \alpha_t[k]$, then table $t_i$ is allocated to node N as an asynchronous copy.

If $\sum_{k=0}^{2} \alpha_t[k] < \gamma \leq 1$, then table $t_i$ is not allocated to node N.

This processing is executed all the combinations of nodes and tables.

Use of the process allocation ratio and the table allocation ratio of a history information whose characteristic is similar has the following advantages. For example, when "performance" has priority in the characteristic of the old-version client-server system, more processes and more tables as asynchronous copies are allocated, with a larger allocation ratio of processes and tables as asynchronous copies. As a result, allocating with probability using this allocation ratio causes supplementary information to be generated that more processes and tables as asynchronous copies are allocated from the first of the current allocation.

The two methods, (a) and (b), may be mixed. For example, the allocation result given with probability based on allocation ratio above mentioned may be entered as supplementary information for combination of process or table and node which is found in the new version but not in the old version.

This makes useful information available especially when a client-server system built in the past is re-modeled or extended, thereby increasing the efficiency of the worker responsible for building a client-server system. In addition, the history information search means 309 automatically searches for past problems or characteristics similar to those of a system to be built and re-creates and enters them as supplementary informations, eliminating the need for the worker responsible for building a client-server system to search for, re-create, and enter that history information.

Next, the allocation means 303 performs allocation, as in the first embodiment, based on the information from the problem input means 300, characteristic input means 301, and supplementary information input means 302 (step 4006 in FIG. 38).

As in the first embodiment, if there is obviously useful information (step 4004 in FIG. 38), it is sent from the supplementary information input means 302 to the allocation means allocation means 303 adding it to the supplementary informations obtained as mentioned above (step 4005 in FIG. 38).

When the allocation means 303 has completed allocation, the allocation result output means 304 outputs the allocation results, such as those shown in FIGS. 24 and 25, as in the first embodiment (step 4007 in FIG. 38). In addition, the worker who is to build a client-server system uses the judgment result input means 305 to determine whether to perform further allocation operation, as in the first embodiment, according to the allocation result displayed by the allocation result output means 304 (step 4008 in FIG. 38). If the worker judges that the allocation work should be continued, he attempts to enter supplementary informations from the supplementary information input means 302; if the worker judges that the allocation work should be ended, the allocation results, such as those shown in FIGS. 27 and 28, are output from the final allocation result output means 306 (step 4009 in FIG. 38).

Finally, the history generation means 307 generates history information by associating the entered problem and characteristic with the final allocation result and then stores it in the history information storage means 308 (step 4010 in FIG. 38).

(3) Effect of the Second Embodiment

In the second embodiment which has the configuration and which operates as described above, data on the problem and characteristic of an earlier client-server system is able to be stored in the history information storage means, making available the information for re-modeling or extending a client-server system built in the past. This increases the efficiency of the worker who is to build a client-server system.

Effect of the Invention

As explained above, the present invention allows the worker who is to build a client-server system to get an effective allocation result for building a system quickly without having to enter a large volume of data for allocation objects. In addition, the present invention allows the developer of a network-computer system build support system to develop the system easily without having to provide a complicated solution which is intended specifically for the allocation problem of the client-server system.

In Japanese Non-Examined Patent Publication No. 5-342303, the designer is responsible for the allocation of processes and databases. On the other hand, the present invention includes the allocation routine into the system as a tool to reduce the load on the designer, and automates the allocation work to eliminate the need for the worker to devise the allocation. In Japanese Non-Examined Patent Publication No. 5-2474, the worker must explicitly specify the parts in order to re-use them. On the other hand, the present invention has the history information search means which searches for past allocation results. These results are then sent to the supplementary information input means to enable necessary parts to be selected automatically, thus reducing the load on the designer.

While a preferred embodiment has been described, variations thereto will occur to those skilled in the art within the scope of the present inventive concepts which are delineated by the following claims.

What is claimed is:

1. A network-computer system build support system, which supports building a network-computer system which is configured such that a plurality of computers are connected to each other over a network and pieces of software are allocated distributedly on said networked computers, said system comprising:

first input means for entering information on a specification of each of said pieces of software which is required in allocating said pieces of software over the network as a problem for obtaining an allocation result of said pieces of software;

second input means for specifying, in advance, a characteristic based on a plurality of evaluation criteria having trade-off relations with each other required for the network-computer system to be built;

third input means for entering supplemental useful information to obtain an allocation result as the need arises;

allocation means for generating a predetermined allocation result based on information entered from said first input means, and said second input means;

first output means for outputting an allocation result generated by said allocation means;

fourth input means for entering a judgment on an allocation result output from said first output means; and second output means for outputting an allocation result that is judged by said fourth input means as the final allocation.

2. A network-computer system build support system as claimed in claim 1, wherein:

said third input means receives only a part of said allocation result as the supplementary information when only said part of said allocation result to be obtained is known.

3. A network-computer system build support system as claimed in claim 1, wherein:

said allocation means comprising:
      a first generation means for generating an initial solution group necessary when the search begins;
      an evaluation means for evaluating each solution of the solution group to determine whether there is an effective solution and, when there is a solution effective, outputs the solution as an allocation result;
      a first selection means for selecting a plurality of relatively effective solutions from said solution group when there is no solution effective as the result of evaluation by said evaluation means; and
      a second generation means for generating a next-generation solution group based on the solution group selected by said first selection means,
   wherein, said evaluation means is given the initial solution group generated by said first generation means and the solution group generated by said second generation means as the said solution group.

4. A network-computer system build support system as claimed in claim 1, further comprising:

a history generation means for generating history information on information from said first input means, said second input means, and said second output means;

a history information storage means for storing history of information generated by said history generation means; and a history information search means for searching the history information storage means for fixed information based on the information entered from said first input means and/or said second input means and for outputting the final allocation result corresponding to said information to said third input means for use as supplementary information.

5. A network-computer system build support system as claimed in claim 1, wherein:

said plurality of evaluation criteria include a plurality of items selected from a group of performance, reliability, security, consistency and cost of the network-computer system.

6. A network-computer system build support system as claimed in claim 3, wherein said evaluation means comprises:

second selection means for selecting the solution that is considered to be the most effective one from a plurality of solutions in said solution group, based on an evaluation value regarding characteristics generated from said second input means;

storage means for storing the solution that is considered to be the most effective one from those that have been searched for; and a generation counter where the number of generations is recorded, wherein said evaluation means evaluates said solution stored in said storage means as the one that is effective enough if said number of generations held in said generation counter is larger than the pre-defined value.

7. A network-computer system build support system as claimed in claim 4, wherein:

said first input means receives configuration management information regarding the current network computer system, said history information storage means stores said information as well as said configuration management information associated with the information and said history information search means searches said history information storage means based on said configuration management information associated with information entered from said first input means and/or said second input means.

8. A network-computer system build support system as claimed in claim 4, wherein said history information search means searches for a history information which has characteristic forming a pattern similar to the pattern of the evaluation value of a characteristic entered from the second input means.

9. A network-computer system build support system as claimed in claim 4, wherein:

said first input means receives configuration management information regarding the current network computer system, said history information storage means stores said information as well as said configuration management information associated with the information and said history information search means searches said history information storage means based on said configuration management information associated with information entered from said first input means and/or said second input means, and searches for a history information which has characteristic forming a pattern similar to the pattern of the evaluation value of a characteristic entered from the second input means.

10. A network-computer system build support system as claimed in claim 4, wherein:
said allocation means comprising:
a first generation means for generating an initial solution group necessary when the search begins;
an evaluation means for evaluating each solution of the solution group to determine whether there is an effective solution and, when there is a solution effective, outputs the solution as an allocation result;
a first selection means for selecting a plurality of relatively effective solutions from said solution group when there is no solution effective as the result of evaluation by said evaluation means; and
a second generation means for generating a next-generation solution group based on a solution group selected by said first selection means,
wherein, said evaluation means is given the initial solution group generated by said first generation means and the solution group generated by said second generation means as the said solution group.

11. A network-computer system build support system as claimed in claim 4, wherein said evaluation means further comprises:
an optimized-solution non-updated counter where the number of generations since the solution in said storage means was last updated is recorded, in addition to said generation counter,
wherein said evaluation means checks if said number of generations recorded in said optimized-solution non-updated counter is larger than the pre-defined value and evaluates said solution stored in said storage means as the one that is effective enough either if said number of generations recorded in said optimized-solution non-updated counter is larger than the pre-defined value or if said number of generations held in said generation counter is larger than the pre-defined value.

12. A network-computer system build support system as claimed in claim 4, wherein:
said evaluation means further comprises a history storage means where a solution selected by said second selection means and the number of the generation of the solution are stored, and
said third input means searches for an allocation combination which has been unstable over a plurality of generations, based on the information stored in said history storage means, when the allocation result from said allocation means is not judged by said fourth input means as the final allocation, and outputs the allocation combination.

13. A network-computer system build support system as claimed in claim 6, wherein:
said evaluation means further comprises a history storage means where a solution selected by said second selection means and the number of the generation of the solution are stored, and
said third input means searches for an allocation combination which has been stable over a plurality of generations, based on the information stored in said history storage means, when the allocation result from said allocation means is not judged by said fourth input means as the final allocation, and outputs the allocation combination.

14. A network-computer system build support system as claimed in claim 6, wherein:
said evaluation means further comprises a solution selection history storage means where a solution selected by said second selection means and the number of the generation of the solution are stored, and
said third input means searches for an allocation combination which has been unstable over a plurality of generations and an allocation combination which has been stable over a plurality of generations, based on the information stored in said history storage means, when the allocation result from said allocation means is not judged by said fourth input means as the final allocation, and outputs those allocation combinations.

15. A network-computer system build support system as claimed in claim 6, wherein said evaluation means evaluates each solution by assigning a weight to the evaluation value of each characteristic entered from said second input means.

16. A network-computer system build support system as claimed in claim 10, wherein said evaluation means comprising:
a second selection means for selecting the solution that is considered to be the most effective one from a plurality of solutions in said solution group, based on an evaluation value regarding characteristics generated from said second input means;
a storage means for storing the solution that is considered to be the most effective one from those that have been searched for;
a generation counter where the number of generations is recorded.

17. A network-computer system build support system as claimed in claim 6, wherein said third input means has display means for displaying said allocation combination.

18. A network-computer system build support system as claimed in claim 13, wherein said third input means has display means for displaying said allocation combination.

19. A network-computer system build support system as claimed in claim 14, wherein said third input means has display means for displaying said allocation combination.

20. A network-computer system build support system as claimed in claim 16, wherein said evaluation means comprising:
an optimized-solution non-update counter where the number of generations since the solution in said storage means was last updated is recorded.

21. A network-computer system build support system as claimed in claim 16, wherein:
said evaluation means further comprises a history storage means where a solution selected by said second selection means and the number of the generation of the solution are stored, and
said third input means searches for an allocation combination which has been unstable over a plurality of generations, based on the information stored in said solution selection history storage means, when the allocation result from said allocation means is not judged by said fourth input means as the final allocation, and outputs the allocation combination.

22. A network-computer system build support system as claimed in claim 16, wherein:
said evaluation means further comprises a history storage means where a solution selected by said second selection means and the number of the generation of the solution are stored, and
said third input means searches for an allocation combination which has been stable over a plurality of generations, based on the information stored in said solution selection history storage means, when the allocation result from said allocation means is not judged by said fourth input means as the final allocation, and outputs the allocation combination.

23. A network-computer system build support system as claimed in claim 16, wherein:

said evaluation means further comprises a solution selection history storage means where a solution selected by said second selection means and the number of the generation of the solution are stored, and said third input means searches for an allocation combination which has been unstable over a plurality of generations and an allocation combination which has been stable over a plurality of generations, based on the information stored in said solution selection history storage means, when the allocation result from said allocation means is not judged by said fourth input means as the final allocation, and outputs those allocation combinations.

24. A network-computer system build support system as claimed in claim 16, wherein said evaluation means evaluates each solution by assigning a weight to the evaluation value of each characteristic entered from said second input means.

25. A network-computer system build support system as claimed in claim 21, wherein said third input means has display means for displaying said allocation combination.

26. A network-computer system build support system as claimed in claim 22, wherein said third input means has display means for displaying said allocation combination.

27. A network-computer system build support system as claimed in claim 23, wherein said third input means has display means for displaying said allocation combination.

28. A network-computer system build support method for building a network-computer system which is configured such that a plurality of computers are connected to each other over a network and pieces of software are allocated distributedly on said networked computers, said method comprising:

a first input step for entering information on a specification of each of said pieces of software which is required in allocating said pieces of software over the network as a problem for obtaining an allocation result of said pieces of software;

a second input step for specifying, in advance, a characteristic based on a plurality of evaluation criteria having trade-off relations with each other required for the network-computer system to be built;

a third input step for entering supplemental useful information to obtain an allocation result as the need arises;

an allocation step for generating a predetermined allocation result based on information entered in said first input step, and said second input step;

a first output step for outputting an allocation result generated in said allocation step;

a fourth input step for entering a judgment on an allocation result output in said first output step; and a second output step for outputting an allocation result that is judged in said fourth input step as the final allocation.

29. A network-computer system build support method as claimed in claim 28, wherein:

a part of said allocation result is received as the supplementary information, in said third input step.

30. A network-computer system build support system as claimed in claim 28, further comprising:

a history generation step for generating history information on information in said first input step, said second input step, and said second output step;

a history information storage step for storing history of information generated in said history generation step; and a history information search step for searching the information stored in said history information storage step for fixed information based on the information entered in said first input step and/or said second input step and for outputting the final allocation result corresponding to said information to said supplementary information input step for use as supplementary information.

31. A network-computer system build support method as claimed in claim 28, wherein:

said plurality of evaluation criteria include a plurality of items selected from a group of performance, reliability, security, consistency and cost of the network-computer system.

* * * * *

UNITED STATES PATENT AND TRADEMARK OFFICE
CERTIFICATE OF CORRECTION

PATENT NO. : 6,272,543 B1  Page 1 of 1
DATED : August 7, 2001
INVENTOR(S) : Nozawa et al.

It is certified that error appears in the above-identified patent and that said Letters Patent is hereby corrected as shown below:

Column 23,
Line 27, change "claim 4" to -- claim 6 --.
Line 43, change "claim 4" to -- claim 6 --.

Column 24,
Line 32, change "claim 6" to -- claim 12 --.

Signed and Sealed this

Fourteenth Day of May, 2002

Attest:

JAMES E. ROGAN
Attesting Officer  Director of the United States Patent and Trademark Office